United States Patent
Cao et al.

(10) Patent No.: US 12,418,373 B2
(45) Date of Patent: Sep. 16, 2025

(54) AGGREGATED UPLINK SHARED CHANNEL TRANSMISSION FOR TWO STEP RANDOM ACCESS CHANNEL PROCEDURE

(71) Applicant: Qualcomm Incorporated, San Diego, CA (US)

(72) Inventors: Yiqing Cao, Beijing (CN); Jing Lei, San Diego, CA (US); Wanshi Chen, San Diego, CA (US); Ruiming Zheng, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 777 days.

(21) Appl. No.: 17/608,645

(22) PCT Filed: Apr. 28, 2020

(86) PCT No.: PCT/CN2020/087429
§ 371 (c)(1),
(2) Date: Nov. 3, 2021

(87) PCT Pub. No.: WO2020/224484
PCT Pub. Date: Nov. 12, 2020

(65) Prior Publication Data
US 2022/0248469 A1 Aug. 4, 2022

(30) Foreign Application Priority Data
May 4, 2019 (WO) ................ PCT/CN2019/085436

(51) Int. Cl.
*H04W 74/0833* (2024.01)
*H04L 5/00* (2006.01)

(52) U.S. Cl.
CPC ....... *H04W 74/0833* (2013.01); *H04L 5/0044* (2013.01); *H04L 5/0048* (2013.01); *H04L 5/0053* (2013.01); *H04L 5/0094* (2013.01)

(58) Field of Classification Search
CPC ......... H04W 74/0833; H04W 72/1268; H04W 74/004; H04W 74/006; H04L 5/0044;
(Continued)

(56) References Cited

U.S. PATENT DOCUMENTS 8,812,045 B2 * 8/2014 Kim ................. H04B 7/063
455/125
2011/0190026 A1 * 8/2011 Nishikawa ............ H04W 52/08
455/522

(Continued)

FOREIGN PATENT DOCUMENTS

| EP | 3949640 A1 | 2/2022 |
| WO | WO-2018085428 A1 | 5/2018 |
| WO | WO-2018157298 A1 | 9/2018 |

OTHER PUBLICATIONS

Supplementary European Search Report—EP20802893—Search Authority—The Hague—Dec. 2, 2022.
(Continued)

*Primary Examiner* — Ivan O Latorre
(74) *Attorney, Agent, or Firm* — Holland & Hart LLP

(57) ABSTRACT

This disclosure relates to methods, devices, and systems for wireless communications, and more particularly to aggregating physical uplink shared channel (PUSCH) resource units relating to a random access message. A user equipment (UE) may identify a random access message of a random access procedure. The random access message may include a random access preamble and a random access payload. The UE may aggregate multiple PUSCH resource units of a set of PUSCH resource units associated with one or more PUSCH occasions (POs) based on one or more of a payload
(Continued)

size of the random access payload or a modulation and coding scheme associated with the random access payload. As a result, the UE may transmit the random access payload of the random access message on a PUSCH using time and frequency resources of the aggregated multiple PUSCH resource units over the one or more POs.

28 Claims, 15 Drawing Sheets

(58) Field of Classification Search
CPC ... H04L 5/0048; H04L 5/0053; H04L 5/0094; H04L 5/0007
See application file for complete search history.

(56) References Cited

U.S. PATENT DOCUMENTS

| | | | |
|---|---|---|---|
| 2018/0097591 A1 | 4/2018 | Islam et al. | |
| 2019/0342921 A1* | 11/2019 | Loehr | H04L 5/0044 |
| 2020/0107322 A1 | 4/2020 | Lunttila et al. | |
| 2022/0015156 A1* | 1/2022 | Xu | H04W 72/0446 |
| 2022/0150980 A1* | 5/2022 | Christoffersson | H04W 72/23 |
| 2022/0232642 A1* | 7/2022 | Ko | H04L 5/0064 |
| 2022/0369373 A1* | 11/2022 | Enbuske | H04W 74/0833 |

OTHER PUBLICATIONS

Taiwan Search Report—TW109123555—TIPO—Nov. 28, 2023.
Huawei., et al., "Discussion on Channel Structure of 2-Step RACH", 3GPP Draft, 3GPP TSG RAN WG1 Meeting #97, R1-1906050, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051727507, 12 Pages, Retrieved from the Internet: URL:http://www.3gpp.org/ftp/Meetings%5F3GPP%5FSYNC/RAN1/Docs/R1%2D1906050%2Ezip [retrieved on May 13, 2019] paragraph [03.2], paragraph [05.4], figure 7.
International Search Report and Written Opinion—PCT/CN2020/087429—ISAEPO—Jul. 14, 2020.
International Search Report and Written Opinion—PCT/CN2019/085436—ISA/EPO—Feb. 12, 2020.
Nokia, et al., "On 2-step RACH Channel Structure," 3GPP TSG RAN WG1#97, R1-1906746, May 3, 2019 (May 3, 2019) sections 1, 2.1, and "2.3 Support of MsgA with Multiple Configurations", 16 pages.
Qualcomm Incorporated: "Two-step RACH msgA Contents and UE ID for Two-step RACH," 3GPP TSG-RAN WG2 Meeting #105bis, R2-1904969, Apr. 12, 2019(Apr. 12, 2019), 3 pages, the whole document.
Sierra Wireless: "Channel Structure for Two-Step RACH Considerations," 3GPP TSG RAN WG1 Meeting #97, R1-1907127, May 3, 2019 (May 3, 2019), 6 pages, the whole document.
VIVO: "Discussion on Channel Structure for 2-step RACH," 3GPP TSG RAN WG1 #97, R1-1906124, May 1, 2019 (May 1, 2019), 14 pages, Retrieved from the Internet: URL: http://www.3gpp.org/ftp/tsg%5Fran/WG1%5FRL1/TSGR1%5F97/Docs/R1%2D1906124%2Ezip. [retrieved on May 1, 2019] Sect. 2.3, the whole document.

* cited by examiner

AGGREGATED UPLINK SHARED CHANNEL TRANSMISSION FOR TWO STEP RANDOM ACCESS CHANNEL PROCEDURE

CROSS-REFERENCE TO REALTED APPLICATIONS

The present patent Application is a 371 national stage filing of International PCT Application No. PCT/CN2020/087429 by Cao et al., entitled "AGGREGATED UPLINK SHARED CHANNEL TRANSMISSION FOR TWO STEP RANDOM ACCESS CHANNEL PROCEDURE," filed Apr. 28, 2020; and claims priority to International PCT Application No. PCT/CN2019/085436 by Cao et al., entitled "AGGREGATED UPLINK SHARED CHANNEL TRANSMISSION FOR TWO STEP RANDOM ACCESS CHANNEL PROCEDURE," filed May 4, 2019, each of which is assigned to the assignee hereof, and each of which is expressly incorporated by reference in its entirety herein.

BACKGROUND

The following relates generally to wireless communications, and more specifically to aggregating multiple physical uplink shared channel (PUSCH) resource units relating to a random access message of a random access procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

SUMMARY

The described techniques relate to improved methods, systems, devices, and apparatuses that support techniques related to a random access procedure (e.g., a two-step random access procedure), and more particularly to aggregating physical uplink shared channel (PUSCH) resource units relating to a random access message in the random access procedure.

A wireless multiple-access communications system may include a number of base stations or network access nodes, each supporting communication for multiple communication devices, which may be otherwise known as user equipments (UE). Some wireless communications systems may support one or more random access procedures, for example, for communication between a UE and a base station. The random access procedures may involve a series of messages exchanged between the UE and the base station.

Generally, the described techniques support aggregating multiple PUSCH resources units to support larger payload sizes of random access messages or reduce a modulation and coding scheme of the random access messages. In some examples, the described techniques may include identifying a random access message of a random access procedure. The random access message may include a random access preamble and a random access payload. The described techniques may include aggregating multiple PUSCH resource units associated with one or more physical uplink shared channel occasions (POs) based on one or more of a payload size of the random access payload, or a modulation and coding scheme associated with the random access payload, or other factors or conditions.

Additionally, the described techniques may include, in some examples, transmitting the random access payload of the random access message on a PUSCH using time and frequency resources of the aggregated multiple PUSCH resource units over the one or more POs. Additionally or alternatively, the described techniques may include transmitting the random access payload of the random access message on a PUSCH using time and frequency resources of the aggregated multiple PUSCH resource units over the one or more POs using a same transmit power or a same modulation and coding scheme. The described techniques may therefore include features for improved resource usage and allocation for one or more random access messages, improved reliability for random access messaging and, in some examples, may promote low latency for random access procedures, among other benefits.

A method of wireless communication at a user equipment (UE) is described. The method may include identifying a random access message of a random access procedure, the random access message including a random access preamble and a random access payload, aggregating multiple PUSCH resource units of a set of PUSCH resource units associated with one or more POs based on one or more of a payload size of the random access payload or a modulation and coding scheme associated with the random access payload, and transmitting the random access payload of the random access message on a PUSCH using time and frequency resources of the aggregated multiple PUSCH resource units over the one or more POs.

An apparatus for wireless communication is described. The apparatus may include a processor, memory in electronic communication with the processor, and instructions stored in the memory. The instructions may be executable by the processor to cause the apparatus to identify a random access message of a random access procedure, the random access message including a random access preamble and a random access payload, aggregate multiple PUSCH resource units of a set of PUSCH resource units associated with one or more POs based on one or more of a payload size of the random access payload or a modulation and coding scheme associated with the random access payload, and transmit the random access payload of the random access message on a PUSCH using time and frequency resources of the aggregated multiple PUSCH resource units over the one or more POs.

Another apparatus for wireless communication is described. The apparatus may include means for identifying a random access message of a random access procedure, the random access message including a random access preamble and a random access payload, aggregating multiple PUSCH resource units of a set of PUSCH resource units associated with one or more POs based on one or more of a payload size of the random access payload or a modulation and coding scheme associated with the random access payload, and transmitting the random access payload of the random access message on a PUSCH using time and frequency resources of the aggregated multiple PUSCH resource units over the one or more POs.

A non-transitory computer-readable medium storing code for wireless communication at a UE is described. The code may include instructions executable by a processor to identify a random access message of a random access procedure, the random access message including a random access preamble and a random access payload, aggregate multiple PUSCH resource units of a set of PUSCH resource units associated with one or more POs based on one or more of a payload size of the random access payload or a modulation and coding scheme associated with the random access payload, and transmit the random access payload of the random access message on a PUSCH using time and frequency resources of the aggregated multiple PUSCH resource units over the one or more POs.

Some examples of the method, apparatuses, and non-transitory computer-readable medium described herein may further include operations, features, means, or instructions for receiving, from a base station, an indication of an aggregation configuration for the PUSCH resource units, and where aggregating the multiple PUSCH resource units of the set of PUSCH resource units may be further based on the aggregation configuration.

In some examples of the method, apparatuses, and non-transitory computer-readable medium described herein, receiving the indication of the aggregation configuration for the PUSCH resource units may include operations, features, means, or instructions for receiving radio resource control (RRC) signaling.

In some examples of the method, apparatuses, and non-transitory computer-readable medium described herein, receiving the indication may include operations, features, means, or instructions for receiving one or more of a random access response (RAR) window for a random access response associated with the random access procedure or a retransmission period of the random access message.

Some examples of the method, apparatuses, and non-transitory computer-readable medium described herein may further include operations, features, means, or instructions for receiving, from a base station, an indication of one or more of a random access channel occasion (RO) configuration or a PO configuration, and mapping one or more ROs to the one or more POs based on the one or more of RO configuration or the PO configuration.

In some examples of the method, apparatuses, and non-transitory computer-readable medium described herein, one or more of the one or more ROs or the one or more POs may be contiguous in one or more of the time domain or the frequency domain.

In some examples of the method, apparatuses, and non-transitory computer-readable medium described herein, one or more of the one or more ROs or the one or more POs may be noncontiguous in one or more of the time domain or the frequency domain.

In some examples of the method, apparatuses, and non-transitory computer-readable medium described herein, mapping the one or more ROs to the one or more POs may include operations, features, means, or instructions for mapping the random access preamble to the one or more POs in one or more of the time domain or the frequency domain based on the RO configuration or the PO configuration.

In some examples of the method, apparatuses, and non-transitory computer-readable medium described herein, mapping the one or more ROs to the one or more POs may include operations, features, means, or instructions for assigning available random access preambles including the random access preamble of the random access message associated with one or more ROs to the one or more POs, and mapping the assigned random access preambles to the one or more POs.

In some examples of the method, apparatuses, and non-transitory computer-readable medium described herein, the RO configuration may include operations, features, means, or instructions for a periodicity of an RO, a time and frequency resource allocation of the RO, a preamble sequence configuration for a contention-based random access (CBRA) procedure or a contention-free random access (CFRA) procedure, an association rule between ROs and POs, or a beam association rule between a synchronization signal blocks (SSBs) or a channel state information reference signal (CSI-RS) and the RO.

In some examples of the method, apparatuses, and non-transitory computer-readable medium described herein, the PO configuration may include operations, features, means, or instructions for a periodicity of a PO, a time and frequency resource allocation of the PO or a PUSCH resource unit, a demodulation reference signal (DMRS) configuration, a PUSCH waveform configuration, beam management information for the PUSCH.

Some examples of the method, apparatuses, and non-transitory computer-readable medium described herein may further include operations, features, means, or instructions for mapping the random access payload to one or more of the one or more ROs or the one or more POs in one or more of the time domain or the frequency domain based on a hopping sequence.

In some examples of the method, apparatuses, and non-transitory computer-readable medium described herein, transmitting the random access payload of the random access message on the PUSCH using time and frequency resources of the aggregated multiple PUSCH resource units over the one or more POs may include operations, features, means, or instructions for transmitting the random access payload of the random access message on time and frequency resources of the aggregated multiple PUSCH resource units using a same modulation and coding scheme for each PUSCH resource unit of the aggregated multiple PUSCH resource units.

Some examples of the method, apparatuses, and non-transitory computer-readable medium described herein may further include operations, features, means, or instructions for determining a modulation and coding scheme capability for the random access message including the random access preamble and the random access payload, and where aggregating the multiple PUSCH resource units of the set of PUSCH resource units associated with the one or more POs may be further based on the modulation and coding scheme capability.

In some examples of the method, apparatuses, and non-transitory computer-readable medium described herein, a payload size of one or more PUSCH resource units of the set of PUSCH resource units may be fixed based on the modulation and coding scheme capability supporting a single modulation and coding scheme.

In some examples of the method, apparatuses, and non-transitory computer-readable medium described herein, a payload size of one or more PUSCH resource units of the set of PUSCH resource units may be variable based on the modulation and coding scheme capability supporting multiple modulation and coding schemes.

In some examples of the method, apparatuses, and non-transitory computer-readable medium described herein, transmitting the random access payload of the random access message on the PUSCH using time and frequency resources of the aggregated multiple PUSCH resource units over the one or more POs may include operations, features, means, or instructions for transmitting, in one or more of the random access preamble or a control portion of the random access payload, an indication of the time and frequency resources of the aggregated multiple PUSCH resource units based on the modulation and coding scheme capability supporting the multiple modulation and coding schemes.

Some examples of the method, apparatuses, and non-transitory computer-readable medium described herein may further include operations, features, means, or instructions for mapping a set of DMRSs to random access preambles of PUSCH resource units of the aggregated multiple PUSCH resource units based on a mapping rule.

In some examples of the method, apparatuses, and non-transitory computer-readable medium described herein, each PUSCH resource unit of the aggregated multiple PUSCH resource units may be associated with a unique DMRS of the set of DMRSs.

In some examples of the method, apparatuses, and non-transitory computer-readable medium described herein, the aggregated multiple PUSCH resource units share a same DMRS of the set of DMRSs.

In some examples of the method, apparatuses, and non-transitory computer-readable medium described herein, aggregating the multiple PUSCH resource units of the set of PUSCH resource units associated with the one or more POs may include operations, features, means, or instructions for comparing the payload size of the random access payload to an aggregated payload size of the aggregated multiple PUSCH resource units, determining a quantity of unused bits of the aggregated payload size of the aggregated multiple PUSCH resource units based on the comparing, and padding each unused bit of the quantity of unused bits of the aggregated payload size of the aggregated multiple PUSCH resource units with a null bit.

Some examples of the method, apparatuses, and non-transitory computer-readable medium described herein may further include operations, features, means, or instructions for receiving, from a base station, an indication of a power configuration, where transmitting the random access payload of the random access message on the PUSCH using time and frequency resources of the aggregated multiple PUSCH resource units over the one or more POs includes transmitting the random access payload of the random access message on time and frequency resources of the aggregated multiple PUSCH resource units using a same transmit power for each PUSCH resource unit of the aggregated multiple PUSCH resource units.

In some examples of the method, apparatuses, and non-transitory computer-readable medium described herein, one or more PUSCH resource units of the set of PUSCH resource units may have a default payload size.

In some examples of the method, apparatuses, and non-transitory computer-readable medium described herein, the default payload size includes one or more bits.

In some examples of the method, apparatuses, and non-transitory computer-readable medium described herein, transmitting the random access payload of the random access message on the PUSCH using time and frequency resources may include operations, features, means, or instructions for transmitting using the time and frequency resources that may be consecutive or nonconsecutive in one or more of a time domain or a frequency domain.

In some examples of the method, apparatuses, and non-transitory computer-readable medium described herein, the random access procedure includes a two-step random access procedure.

Some examples of the method, apparatuses, and non-transitory computer-readable medium described herein may further include operations, features, means, or instructions for receiving a random access response message including an indication to perform a random access fallback procedure, where the random access fallback procedure includes a four-step random access procedure, and performing the random access fallback procedure based on receiving the random access response message.

Some examples of the method, apparatuses, and non-transitory computer-readable medium described herein may further include operations, features, means, or instructions for receiving a random access response message including an indication to retransmit the random access message, and retransmitting the random access message based on the random access response message.

In some examples of the method, apparatuses, and non-transitory computer-readable medium described herein, a PUSCH resource unit of the set of PUSCH resource units spans a PO.

In some examples of the method, apparatuses, and non-transitory computer-readable medium described herein, the aggregated multiple PUSCH resource units span over multiple POs.

A method of wireless communication at a base station is described. The method may include assigning a set of PUSCH resource units associated with one or more POs for transmission of a random access payload of a random access message associated with a random access procedure, determining an aggregation configuration for multiple PUSCH resource units of the set of PUSCH resource units based on assigning the set of PUSCH resource units, and transmitting, to a UE, an indication of the aggregation configuration for the multiple PUSCH resource units.

An apparatus for wireless communication is described. The apparatus may include a processor, memory in electronic communication with the processor, and instructions stored in the memory. The instructions may be executable by the processor to cause the apparatus to assign a set of PUSCH resource units associated with one or more POs for transmission of a random access payload of a random access message associated with a random access procedure, determine an aggregation configuration for multiple PUSCH resource units of the set of PUSCH resource units based on assigning the set of PUSCH resource units, and transmit, to a UE, an indication of the aggregation configuration for the multiple PUSCH resource units.

Another apparatus for wireless communication is described. The apparatus may include means for assigning a set of PUSCH resource units associated with one or more POs for transmission of a random access payload of a random access message associated with a random access procedure, determining an aggregation configuration for multiple PUSCH resource units of the set of PUSCH resource units based on assigning the set of PUSCH resource units, and transmitting, to a UE, an indication of the aggregation configuration for the multiple PUSCH resource units.

A non-transitory computer-readable medium storing code for wireless communication at a base station is described. The code may include instructions executable by a processor to assign a set of PUSCH resource units associated with one or more POs for transmission of a random access payload of a random access message associated with a random access procedure, determine an aggregation configuration for multiple PUSCH resource units of the set of PUSCH resource units based on assigning the set of PUSCH resource units, and transmit, to a UE, an indication of the aggregation configuration for the multiple PUSCH resource units.

Some examples of the method, apparatuses, and non-transitory computer-readable medium described herein may further include operations, features, means, or instructions for receiving, from the UE, a modulation and coding scheme capability for the random access message including the random access preamble and the random access payload, and where determining the aggregation configuration for the multiple PUSCH resource units of the set of PUSCH resource units may be further based on the modulation and coding scheme capability.

In some examples of the method, apparatuses, and non-transitory computer-readable medium described herein, transmitting the indication of the aggregation configuration for the multiple PUSCH resource units may include operations, features, means, or instructions for transmitting RRC signaling.

In some examples of the method, apparatuses, and non-transitory computer-readable medium described herein, transmitting the indication may include operations, features, means, or instructions for transmitting one or more of a RAR window for a random access response associated with the random access procedure or a retransmission period of the random access message.

Some examples of the method, apparatuses, and non-transitory computer-readable medium described herein may further include operations, features, means, or instructions for transmitting, to the UE, a second indication of one or more of an RO configuration or a PO configuration, and mapping one or more ROs to the one or more POs based on the one or more of RO configuration or the PO configuration.

In some examples of the method, apparatuses, and non-transitory computer-readable medium described herein, one or more of the one or more ROs or the one or more POs may be noncontiguous in one or more of the time domain or the frequency domain.

In some examples of the method, apparatuses, and non-transitory computer-readable medium described herein, one or more of the one or more ROs or the one or more POs may be contiguous in one or more of the time domain or the frequency domain.

In some examples of the method, apparatuses, and non-transitory computer-readable medium described herein, mapping the one or more ROs to the one or more POs may include operations, features, means, or instructions for mapping the random access preamble to the one or more POs in one or more of the time domain or the frequency domain based on the RO configuration or the PO configuration.

In some examples of the method, apparatuses, and non-transitory computer-readable medium described herein, the RO configuration may include operations, features, means, or instructions for a periodicity of an RO, a time and frequency resource allocation of the RO, a preamble sequence configuration for a CBRA procedure or a CFRA procedure, an association rule between ROs and POs, or a beam association rule between a SSBs or a CSI-RS and the RO.

In some examples of the method, apparatuses, and non-transitory computer-readable medium described herein, the PO configuration may include operations, features, means, or instructions for a periodicity of a PO, a time and frequency resource allocation of the PO or a PUSCH resource unit, a DMRS configuration, a PUSCH waveform configuration, beam management information for a PUSCH.

Some examples of the method, apparatuses, and non-transitory computer-readable medium described herein may further include operations, features, means, or instructions for receiving, from the UE, the random access payload of the random access message on a PUSCH using time and frequency resources of aggregated multiple PUSCH resource units over one or more POs.

Some examples of the method, apparatuses, and non-transitory computer-readable medium described herein may further include operations, features, means, or instructions for transmitting, to the UE, a second indication of a power configuration, where receiving the random access payload of the random access message on the PUSCH using time and frequency resources of the aggregated multiple PUSCH resource units over the one or more POs includes receiving the random access payload of the random access message on time and frequency resources of the aggregated multiple PUSCH resource units using a same power configuration for each PUSCH resource unit of the aggregated multiple PUSCH resource units.

In some examples of the method, apparatuses, and non-transitory computer-readable medium described herein, one or more PUSCH resource units of the set of PUSCH resource units may have a default payload size.

In some examples of the method, apparatuses, and non-transitory computer-readable medium described herein, the default payload size includes one or more bits.

In some examples of the method, apparatuses, and non-transitory computer-readable medium described herein, the random access procedure includes a two-step random access procedure.

Some examples of the method, apparatuses, and non-transitory computer-readable medium described herein may further include operations, features, means, or instructions for transmitting a random access response message including an indication to perform a random access fallback procedure, where the random access fallback procedure includes a four-step random access procedure, and performing the random access fallback procedure based on the random access response message.

Some examples of the method, apparatuses, and non-transitory computer-readable medium described herein may further include operations, features, means, or instructions for transmitting a random access response message including an indication to the UE to retransmit the random access message.

In some examples of the method, apparatuses, and non-transitory computer-readable medium described herein, a PUSCH resource unit of the set of PUSCH resource units spans a PO.

In some examples of the method, apparatuses, and non-transitory computer-readable medium described herein, the aggregated multiple physical uplink shared channel resource units span over multiple POs.

DETAILED DESCRIPTION

Figure 1:
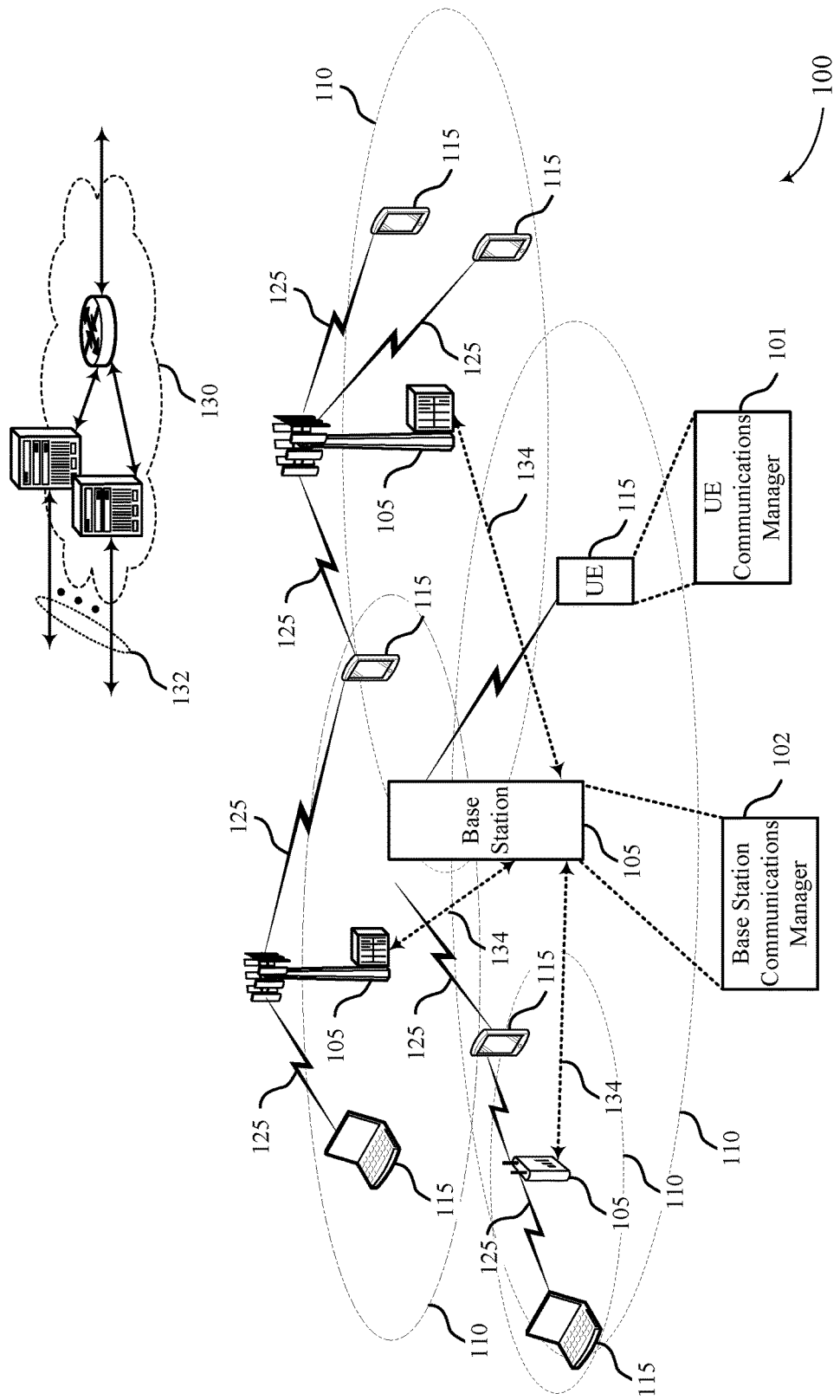
FIG. 1 illustrates an example of a wireless communications system that supports aggregated uplink shared channel transmission for two-step random access channel procedures in accordance with one or more aspects of the present disclosure.

Some wireless communications systems may have one or more user equipments (UEs) and one or more base stations, for example, next-generation NodeBs or giga-NodeBs (either of which may be referred to as a gNB) that support one or more random access procedures for communication, including an initial access to a channel, a connection re-establishment, a handover procedure, or synchronization on the channel, among others. The random access procedure may include a series of handshake messages, such as random access messages carrying information that may facilitate the communication between the UE and the base station. In some examples, a random access procedure may be or may include a two-step random access procedure, which may reduce latency compared to other random access procedures that use a greater number of handshake messages, for example, such as a four-step random access procedure. As demand for communication efficiency increases, it may be desirable for a UE to seek improved reliability for random access messaging, as well as target efficient resource usage for random access procedures, particularly for variable payload sizes of different random access messages.

As described herein, UEs and base stations may support aggregating multiple PUSCH resources units to support larger payload sizes of random access messages or reduce a modulation and coding scheme of the random access messages, among other benefits. In some examples, a UE may identify a random access message of a random access procedure. The random access message may include a random access preamble and a random access payload. The UE may aggregate multiple physical uplink shared channel (PUSCH) resource units associated with one or more physical uplink shared channel occasions (POs) based on one or more of a payload size of the random access payload or a modulation and coding scheme associated with the random access payload, or other factors or conditions. Additionally, the UE may transmit the random access payload of the random access message on a PUSCH using time and frequency resources of the aggregated multiple PUSCH resource units over the one or more POs.

Particular aspects of the subject matter described herein may be implemented to realize one or more advantages. The described techniques may support improvements in resource usage (e.g., time and frequency resources) for random access messages, among other advantages. As such, supported techniques may include features for efficient random access procedures. The described techniques may also support improved reliability for random access messaging and, in some examples, may promote low latency for random access procedures, among other benefits.

Aspects of the disclosure are initially described in the context of a wireless communications system. Aspects of the disclosure are further described in the context of one or more additional wireless communications systems and one or more process flows that relate to aspects for aggregated uplink shared channel transmission for two-step random access channel procedures. Aspects of the disclosure are further illustrated by and described with reference to apparatus diagrams, system diagrams, and flowcharts that relate to several aspects related to aggregated uplink shared channel transmission for two-step random access channel procedures.

FIG. 1 illustrates an example of a wireless communications system 100 that supports aggregated uplink shared channel transmission for two-step random access channel procedures in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, which may be for example in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission, or reception, or both by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, or the like) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include or consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115, or both that support simultaneous communications via carriers associated with more than one different carrier bandwidth. Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include or consist of one or multiple symbol periods. In some cases, the TTI duration (that is, the number of symbol periods in a TTI) may be variable. Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may perform a connection procedure, such as a cell acquisition procedure, a random access procedure, or the like with a UE 115. For example, a base station 105 and a UE 115 may perform a random access procedure to establish a connection. In some other examples, a base station 105 and a UE 115 may perform a random access procedure to re-establish a connection after connection failure (such as radio-link failure) with the base station 105, or to establish a connection for handover to another base station, or the like. In some examples, the random access procedure may be a four-step random access procedure. As part of the four-step random access procedure, the UE 115 may transmit a random access message (message 1 (msg1)) carrying a random access preamble. The random access preamble may enable the base station 105 to distinguish between multiple UEs 115 attempting to access the wireless communications system 100 simultaneously.

The base station 105 may respond with a random access response (message 2 (msg2)) that provides an uplink resource grant, a timing advance, and a temporary cell-radio network temporary identifier (C-RNTI). The UE 115 may transmit a subsequent random access message (message 3

(msg3)) that includes an RRC connection request along with a temporary mobile subscriber identity (TMSI) (e.g., if the UE 115 has previously been connected to the same wireless network) or a random identifier. The RRC connection request may also indicate the reason the UE 115 is connecting to the network, for example, such as one or more of an emergency, signaling, or data exchange. The base station 105 may respond to the connection request with a contention resolution message (message 4 (msg4)) addressed to the UE 115, which may provide a new C-RNTI. If the UE 115 receives a contention resolution message with the correct identification, it may proceed with an RRC connection setup. If the UE 115 does not, however, receive a contention resolution message (for example, if there is a conflict with another UE 115) it may repeat the random access process by transmitting a new random access preamble. As described, the exchange of messages between the UE 115 and the base station 105 for random access may be referred to as a four-step random access procedure.

In other examples, a two-step random access procedure may be performed for random access. A UE 115 that operates in licensed or unlicensed spectrum within the wireless communications system 100 may participate in a two-step random access procedure to reduce delay in establishing communication with a base station 105 (such as compared to a four-step random access procedure). In some examples, the two-step random access procedure may operate regardless of whether a UE 115 has a valid timing advance parameter. For example, the UE 115 may use a valid timing advance parameter to coordinate the timing of its transmissions to a base station 105 (to account for propagation delay) and may receive the valid timing advance parameter as part of the two-step random access procedure. The two-step random access procedure may be applicable to any cell size regardless of whether the random access procedure is contention-based or contention-free, and may combine multiple random access messages from a four-step random access procedure.

The UE 115 may transmit a first random access message (for example, message A (msgA)) to the base station 105. The first random access message may include, for example, the contents of a msg1 and a msg3 from a four-step random access procedure. Additionally, msgA may include or consist of a random access preamble and a PUSCH carrying a random access payload with the contents of the message (for example, the content of a msg3 in a four-step random access procedure). The UE 115 may transmit the random access preamble on a physical random access channel (PRACH). In some examples, the PUSCH may also carry a reference signal, such as a PUSCH demodulation reference signal (DMRS). In some other examples, the base station 105 may transmit a downlink control channel (such as a physical downlink control channel (PDCCH) or physical downlink shared channel (PDSCH)) carrying a corresponding second random access message (for example, message B (msgB)) to the UE 115. The second message may include, for example, the contents of a msg2 and a msg4 from a four-step random access procedure.

A random access payload of a PUSCH may, in some examples, have a variable payload size, for example, based on contents of a random access message (for example, contents of a msg3 in a four-step random access procedure). The random access payload may have a baseline payload size (which may also be referred to as a default payload size), for example, such as 56 bits or 72 bits. In some examples, however, a payload size of the random access payload may exceed resources allocated for the PUSCH. As demand for communication efficiency increases in the wireless communications system 100, it may be desirable for UEs 115 to target efficient resource usage for random access procedures, particularly for variable payload sizes of random access payloads carried on PUSCHs. As described herein, base stations 105 and UEs 115 may support aggregating PUSCH resource units relating to a random access message (e.g., msgA) in a random access procedure, for example, to address challenges with variable size random access payloads for PUSCH transmissions. As a result, UEs 115 may be capable of supporting larger payload sizes of random access payloads, as well as reduce a modulation and coding scheme of random access messages. For example, each PUSCH resource unit may be capable of supporting a predefined payload, for example, such as 56 bits, 72 bits, 1000 bits, or the like with a modulation and coding scheme as further described in more detail herein.

Base stations 105 may also include a base station communications manager 102, which may manage communications in a terrestrial communications system. For a base station 105, base station communications manager 102 may assign a set of PUSCH resource units associated with one or more POs for transmission of a random access payload of a random access message associated with a random access procedure. In some examples, base station communications manager 102 may determine an aggregation configuration for multiple PUSCH resource units of the set of PUSCH resource units based on assigning the set of PUSCH resource units. The base station communications manager 102 may transmit, for example, to the UE communications manager 101 of a UE 115, an indication of the aggregation configuration for the multiple PUSCH resource units.

UEs 115 may include a UE communications manager 101, which may manage communications in a terrestrial communications system. For a UE 115, UE communications manager 101 may identify a random access message (e.g., msgA) of a random access procedure (e.g., a two-step random access procedure). The random access message may include a random access preamble and a random access payload. The UE communications manager 101 may aggregate multiple PUSCH resource units of a set of PUSCH resource units associated with one or more POs based on one or more of a payload size of the random access payload or a modulation and coding scheme associated with the random access payload.

In some examples, transmission of a random access preamble on a PRACH and transmission of a PUSCH carrying a random access payload may occur over one or more occasions. For example, transmission of a random access preamble on a PRACH may occur over a random access channel occasion (RO), which may include time and frequency resources. In other examples, transmission of a PUSCH carrying a random access payload may occur over a PO, which may include time and frequency resources. In some examples, the time and frequency resources may be consecutive or non-consecutive. There may also be a relationship between one or more occasions, for example, ROs and POs may have a one-to-one mapping. That is, a single RO may map to a single respective PO. In some examples, ROs and POs may have one-to-many mappings, for example, a single RO may map to several POs. Alternatively, multiple ROs may map to a single PO using a many-to-one mapping. The UE 115 may multiplex bits of a random access payload over time and frequency resources of the aggregated multiple PUSCH resource units of one or more POs. The UE communications manager 101 may transmit, to base station communications manager 102, the random access payload of the random access message on a PUSCH using time and frequency resources of the aggregated multiple PUSCH resource units over the one or more POs. The wireless communications system 100 may therefore include features for improved resource usage for random access messages, improved reliability for random access messaging and, in some examples, may promote low latency for random access procedures, among other benefits.

Figure 2A:
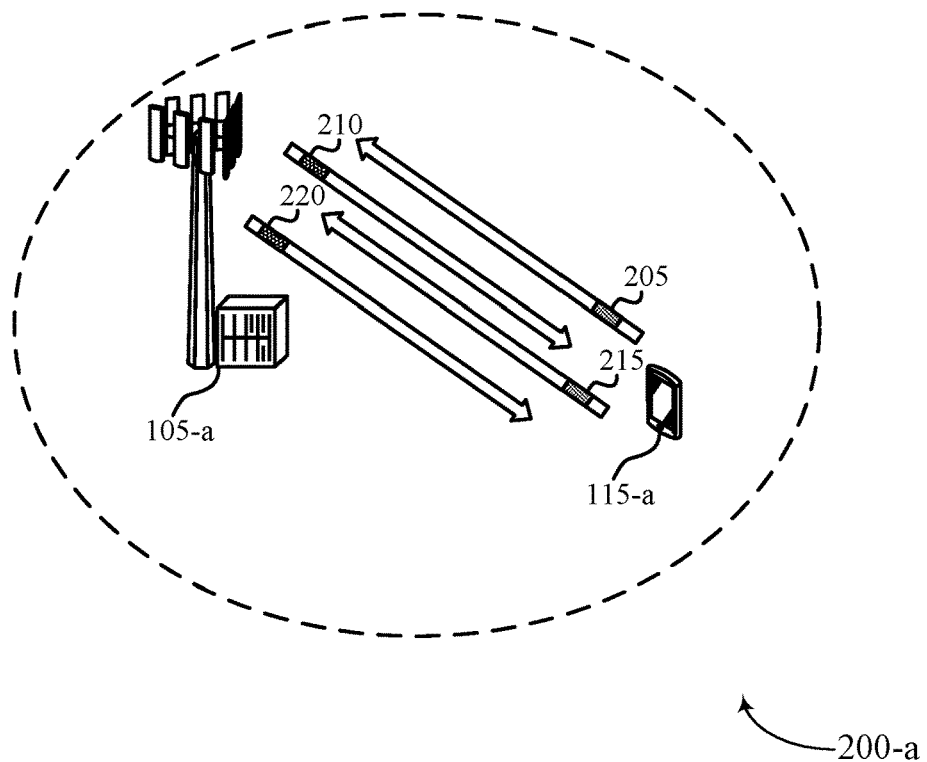
FIGS. 2A and 2B illustrate examples of wireless communications systems that support aggregated uplink shared channel transmission for two-step random access channel procedures in accordance with one or more aspects of the present disclosure.

FIG. 2A illustrates an example of a wireless communications system 200-a that supports aggregated uplink shared channel transmission for two-step random access channel procedures in accordance with one or more aspects of the present disclosure. In some examples, the wireless communications system 200-a may implement aspects of the wireless communications system 100. For example, the wireless communications system 200-a may include a base station 105-a and a UE 115-a, which may be examples of the corresponding devices described with reference to FIG. 1.

The base station 105-a may perform a connection procedure (e.g., an RRC procedure, a cell acquisition procedure, a random access procedure) with the UE 115-a. For example, the base station 105-a and the UE 115-a may perform a random access procedure to establish a connection for wired or wireless communication. In other examples, the base station 105-a and the UE 115-a may perform a random access procedure to re-establish a connection after an issue, such as connection failure, with the base station 105-a, or the like. The base station 105-a and the UE 115-a may also support multiple radio access technologies including 4G systems such as LTE systems, LTE-A systems, or LTE-A Pro systems, and 5G systems which may be referred to as NR systems.

The connection procedure (e.g., random access procedure) between the base station 105-a and the UE 115-a may correspond to, for example, at least one of the above example radio access technologies. By way of example, in FIG. 2A, a random access procedure may be related to 4G systems and may be referred to as a four-step random access procedure. As part of the four-step random access procedure, the base station 105-a and the UE 115-a may transmit one or more messages (e.g., handshake messages), such as a random access message 205 (which may also be referred to as msg1), a random access message 210 (which may also be referred to as msg2), a random access message 215 (which may also be referred to as msg3), and a random access message 220 (which may also be referred to as msg4).

The random access procedure may include the UE 115-a transmitting the random access message 205, which may include a preamble (which may also be referred to as a random access channel preamble, a PRACH preamble, or a sequence) that may carry information, such as a UE identifier. In some examples, the UE 115-a may transmit a preamble over an RO. The purpose of the preamble transmission may be to provide an indication to the base station 105-a presence of a random access attempt, and to allow the base station 105-a to determine a delay (e.g., a timing delay) between the base station 105-a and the UE 115-a. The UE 115-a may transmit the random access message 205 to the base station 105-a on a PRACH, for example.

The preamble of the random access message 205 may, in some examples, be defined by a preamble sequence and a cyclic prefix. A preamble sequence may be defined based on a Zadoff-Chu sequence. The UE 115-a may additionally or alternatively use a guard period to handle timing uncertainty of the random access message 205 transmission. For example, before beginning the random access procedure, the UE 115-a may obtain downlink synchronization with the base station 105-a based in part on a cell-search procedure.

However, because the UE 115-a has not yet obtained uplink synchronization with the base station 105-a, there may be an uncertainty in uplink timing due to the location of the UE 115-a in the cell (e.g., geographic coverage area of base station 105-a) not being known.

In some examples, the uncertainty in uplink timing may be based on a dimension (e.g., size, area) of the cell. Therefore, including a cyclic prefix to the random access message 205 may be beneficial, in some examples, for handling the uncertainty in uplink timing. Per cell, there may be a number of preamble sequences (e.g., 64 preamble sequences). The UE 115-a may select a preamble sequence from a set of sequences in a cell (e.g., geographic coverage area of base station 105-a) based on, for example, a randomness selection. In some examples, the UE 115-a may select a preamble sequence based on an amount of traffic that the UE 115-a has for transmission on an uplink shared channel (UL-SCH). From the preamble sequence that the UE 115-a selected, the base station 105-a may determine the amount of uplink resources to be granted to the UE 115-a.

Some examples of a random access procedure may be contention-based or contention-free. When performing a contention-based random access (CBRA) procedure, the UE 115-a may select a preamble sequence from a set of sequences. That is, as long as other UEs (not shown) are not performing a random access attempt using the same sequence at a same temporal instance, no collisions will occur, and the random access attempt may be detected by the base station 105-a. If the UE 115-a is performing a contention-free random access (CFRA) attempt, for example, for a handover to a new cell, the preamble sequence to use may be explicitly signaled (e.g., in control information) by the base station 105-a. To avoid collisions or interference, the base station 105-a may select a contention-free preamble sequence from sequences not associated with the CBRA attempt.

Upon receiving the random access message 205, the base station 105-a may respond appropriately with a random access message 210. For example, the base station 105-a may transmit the random access message 210 to the UE 115-a on a downlink shared channel (DL-SCH) or a PDCCH. In some examples, the random access message 210 may have a same or a different configuration (format) compared to the random access message 205. The random access message 210 may carry information for the UE 115-a, where the information may be determined by the base station 105-a based on information carried in the random access message 205. For example, the information in the random access message 210 may include an index of a detected preamble sequence and for which the response is valid, a timing advance parameter determined based on the detected preamble sequence, a scheduling grant indicating time and frequency resources for the UE 115-a to use for transmission of a next random access message transmission by the UE 115-a, or a network identifier for further communication with the UE 115-a, or the like.

The UE 115-a (and additional UEs (not shown)) may monitor the PDCCH to detect and receive a random access message (e.g., the random access message 210), from the base station 105-a. In some examples, the UE 115-a may monitor the PDCCH for a random access message transmission from the base station 105-a during a random access response (RAR) window, which may be fixed or variable in size. For example, if the UE 115-a does not detect and receive a random access message transmission from the base station 105-*a*, the random access attempt may be declared as a failure and the random access procedure in FIG. 2A may repeat. However, in the subsequent attempt, the RAR window may be adjusted (e.g., increased or decreased in duration). In some examples, the base station 105-*a* may configure an expected time window for the RAR window and an expiration timer for random access message retransmissions.

Once the UE 115-*a* successfully receives the random access message 210, the UE 115-*a* may obtain uplink synchronization with the base station 105-*a*. In some examples, before data transmission from the UE 115-*a*, a unique identifier within the cell may be assigned to the UE 115-*a*. In some examples, depending on a state (e.g., a connected state, an ideal state) of the UE 115-*a* there may be a desire for an additional message (e.g., a connection request message) exchange for setting up the connection between the base station 105-*a* and the UE 115-*a*. The UE 115-*a* may transmit any messages, for example, the random access message 215 to the base station 105-*a* using the UL-SCH resources (or PUSCH resources) assigned in the random access message 210. The random access message 210 may include a UE identifier for contention resolution. If the UE 115-*a* is in a connected state, for example, the UE identifier may be a C-RNTI. Otherwise, the UE identifier may be specific to the UE 115-*a*.

The base station 105-*a* may receive the random access message 215 and may respond properly, for example, by transmitting the random access message 220, which may be a contention resolution message. When multiple UEs (including the UE 115-*a*) are performing simultaneously random access attempts using a same preamble sequence, these UEs may result in listening for a same response message (e.g., the random access message 220). Each UE (including the UE 115-*a*) may receive the random access message 220 and compare an identifier (e.g., network identifier) in the random access message 220 to the identifier specified in the random access message 215. When the identifiers match, the corresponding UE (e.g., the UE 115-*a*) may declare the random access procedure successful. UEs that do not identify a match between the identifiers are considered to have failed the random access procedure and may repeat the random access procedure with the base station 105-*a*. As a result of the connection procedure, the base station 105-*a* and the UE 115-*a* may establish a connection for wired or wireless communication. Although, the connection procedure (e.g., random access procedure) in FIG. 2A may be effective for facilitating random access for the UE 115-*a*, there may be unnecessary latencies associated with this procedure. The UE 115-*a* may therefore support a two-step random access procedure to reduce latencies associated with processes related to initial channel access.

Figure 2B:
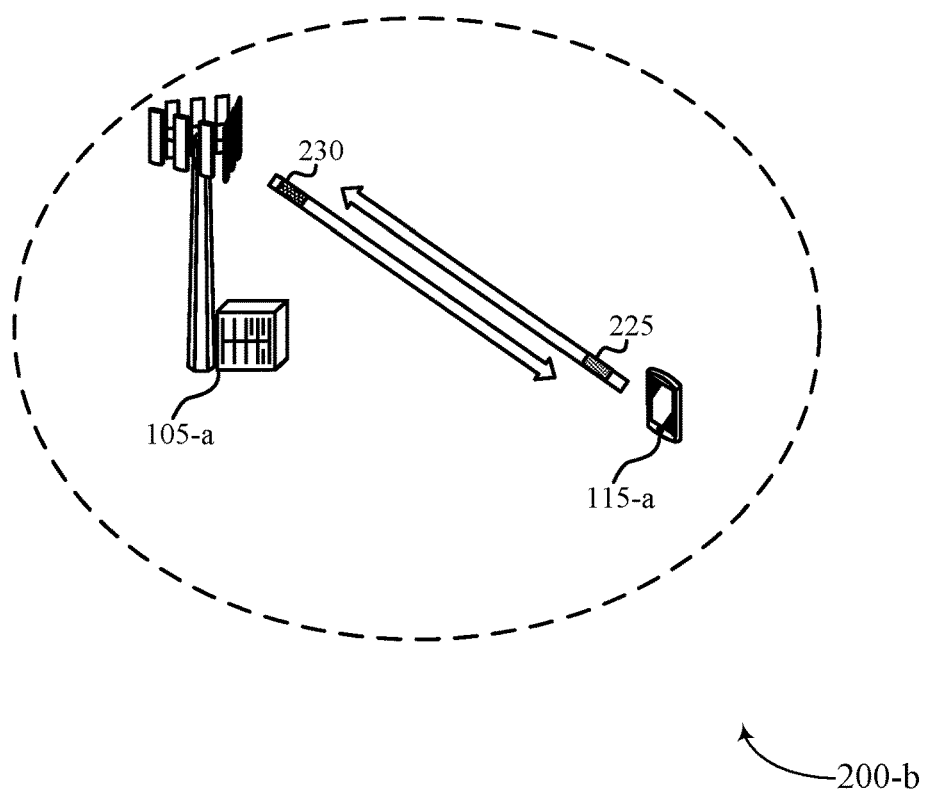

FIG. 2B illustrates an example of a wireless communications system 200-*b* that supports aggregated uplink shared channel transmission for two-step random access channel procedures in accordance with one or more aspects of the present disclosure. In some examples, the wireless communications system 200-*b* may implement aspects of the wireless communications system 100. For example, the wireless communications system 200-*b* may include a base station 105-*a* and a UE 115-*a*, which may be examples of the corresponding devices described with reference to FIG. 1. The wireless communications system 200-*b* may support variable payload sizes and, in some examples, may promote low latency of random access procedures, among other benefits.

The base station 105-*a* and the UE 115-*a* may, as explained with reference to FIG. 2A, support multiple radio access technologies including 4G systems such as LTE systems, LTE-A systems, or LTE-A Pro systems, and 5G systems which may be referred to as NR systems. The connection procedure (e.g., random access procedure) between the base station 105-*a* and the UE 115-*a* may correspond to, for example, at least one of these example radio access technologies. In the example of FIG. 2B, the random access procedure may be related to 5G systems and may be referred to as a two-step random access procedure. As part of a two-step random access procedure, to decrease latencies related to contention-based aspects of the two-step random access procedure, the base station 105-*a* and the UE 115-*a* may exchange fewer messages (e.g., handshake messages) compared to a four-step random access procedure, as explained in FIG. 2A.

For example, the UE 115-*a* may transmit a single message, such as a random access message 225 (which may also be referred to as msgA), and the base station 105-*a* may transmit a single message, such as a random access response message 230 (which may also be referred to as msgB) in response to the random access message 225. The random access message 225 (e.g., msgA) may combine parts of msgs1,3 of a four-step random access procedure, while the random access response message 230 (e.g., msgB) may combine aspects of msgs2,4 of the four-step random access procedure.

In some examples, transmission of a random access preamble on a PRACH and transmission of a PUSCH carrying a random access payload may occur over one or more occasions. For example, transmission of a random access preamble on a PRACH may occur over an RO, which may include time and frequency resources. In other examples, transmission of a PUSCH carrying a random access payload may occur over a PO, which may include time and frequency resources. In some examples, the time and frequency resources may be consecutive or non-consecutive. There also may be a relationship between one or more occasions, for example, ROs and POs may have a one-to-one mapping. That is, a single RO may map to a single respective PO. In some examples, ROs and POs may have one-to-many mappings, for example, a single RO may map to several POs. Alternatively, multiple ROs may map to a single PO using a many-to-one mapping.

In some examples, a random access payload of the random access message 225 (e.g., msgA) may have a variable payload size, for example, based on contents of a random access message (for example, contents of a msg3 in a four-step random access procedure). In some examples, however, a payload size of the random access payload may exceed resources allocated for the PUSCH. It may be therefore desirable for UE 115-*a* to target improved resource usage for random access procedures, particularly for variable payload sizes of random access payloads carried on PUSCHs of the random access message 225 (e.g., msgA). With reference to FIGS. 2A and 2B, the base station 105-*a* and the UE 115-*a* may support aggregating PUSCH resource units relating to a random access message (e.g., msgA) in a random access procedure, to address challenges with variable size random access payloads.

As a result, the base station 105-*a* and the UE 115-*a* may be capable of supporting larger payload sizes of random access payloads, as well as reducing a modulation and coding scheme of random access messages. For example, PUSCH resource units may be capable of supporting variable payload size, for example, such as 8 bits, 16 bits, 24 bits, 56 bits, 72 bits, 1000 bits, or the like with a modulation and coding scheme.

The base station 105-a may assign a set of PUSCH resource units associated with one or more POs for transmission of a random access payload of the random access message 225 (e.g., msgA), and determine an aggregation configuration for multiple PUSCH resource units of the set of PUSCH resource units. A PUSCH resource unit may occupy time and frequency resources. Time and frequency resources, as described herein, may include symbol periods, slots, subcarriers, carriers, and the like. Each PUSCH resource unit may therefore span a number of symbols, slots, and physical resource blocks, and may carry a predefined payload (e.g., 56 bits or 72 bits).

In some examples, a PUSCH resource unit of the set of PUSCH resource units may span a PO, which may also include an allocation of time and frequency resources for a PUSCH transmission. In some other examples, multiple aggregated PUSCH resource units may span over multiple POs. PUSCH resource units of the multiple aggregated PUSCH resource units may be, in some examples, contiguous in one or more of a time domain or a frequency domain. Additionally or alternatively, PUSCH resource units of the multiple aggregated PUSCH resource units may be, in some other examples, non-contiguous in one or more of a time domain or a frequency domain.

In some examples, the UE 115-a may transmit a modulation and coding scheme capability, which the base station 105-a may use to determine an aggregation configuration for multiple PUSCH resource units. In some examples, the base station 105-a may identify that the UE 115-a supports a single modulation and coding scheme based on the provided modulation and coding scheme capability. Multiple aggregated PUSCH resource units may, in some examples, use a same modulation and coding scheme. In some examples, if the modulation and coding scheme capability supports a single modulation and coding scheme (e.g., quadrature phase shift keying (QPSK) plus half coding rate), a payload size of one or more PUSCH resource units may be fixed. Alternatively, if the modulation and coding scheme capability supports multiple modulation and coding schemes, a payload size of one or more PUSCH resource units may be fixed or variable.

For a variable payload size of one or more PUSCH resource units, the UE 115-a may transmit an indication of occupied resources (e.g., resource elements, resource element groups) in a preamble or in a dedicated control part of the random access message 225 (e.g., msgA) to the base station 105-a. In some examples, the UE 115-a may apply a zero padding on unused bits of a random access payload when a payload size of the random access payload is smaller than a payload size of a PUSCH resource unit. For example, the UE 115-a may compare a payload size of a random access payload of the random access message 225 to an aggregated payload size of an aggregated multiple PUSCH resource unit, and determine a number of unused bits of the aggregated payload size of the aggregated multiple PUSCH resource units based on the comparison. As a result, the UE 115-a may pad each unused bit of the number of unused bits of the aggregated payload size of the aggregated multiple PUSCH resource units with a null bit.

The base station 105-a may transmit the aggregation configuration for multiple PUSCH resource units to the UE 115-a via higher layer signaling, for example, such as RRC signaling. The UE 115-a may aggregate multiple PUSCH resource units of a set of PUSCH resource units associated with one or more POs based on one or more of a payload size of the random access payload or a modulation and coding scheme associated with the random access payload. The UE 115-a may transmit the random access payload of the random access message 225 on a PUSCH using time and frequency resources of the aggregated multiple PUSCH resource units over one or more POs.

In some examples, base station 105-a may, as part of the random access procedure, transmit an RO configuration or a PO configuration to the UE 115-a. The RO configuration may include one or more of: a periodicity of an RO, a time and frequency resource allocation of the RO, a preamble sequence configuration for a CBRA procedure or a CFRA procedure, an association rule between ROs and POs, or a beam association rule between a synchronization signal block (SSB) or a channel state information reference signal (CSI-RS) and the RO. The PO configuration may include one or more of: a periodicity of a PO, a time and frequency resource allocation of the PO or a PUSCH resource unit, a DMRS configuration, or a PUSCH waveform configuration, beam management information for a PUS CH.

The UE 115-a may use the association rule between ROs and POs provided in the RO configuration to support mapping between ROs and POs. In some examples, ROs and POs may have a one-to-one mapping. For example, a single RO may map to a single PO. In some examples, ROs and POs may have one-to-many mappings, for example, a single RO may map to several POs. Alternatively, multiple ROs may map to a single PO using a many-to-one mapping. Therefore, the UE 115-a may support different mapping configurations (e.g., one-to-many mappings) between ROs and POs using the association rule. In some examples, the association rule may be preconfigured by a network operator. In some examples, base station 105-a may transmit the association rule in the RO configuration via upper layer signaling (e.g., RRC signaling).

The UE 115-a may map one or more ROs to one or more POs to support the multiple aggregated PUSCH resource units. In some examples, one or more of the one or more ROs or the one or more POs may be noncontiguous in one or more of a time domain or a frequency domain. Alternatively, one or more of the one or more ROs or the one or more POs may be contiguous in one or more of the time domain or the frequency domain. In some examples, UE 115-a may map the random access preamble of the random access message 225 to the one or more POs in one or more of the time domain or the frequency domain based on the RO configuration or the PO configuration.

In some other examples, the UE 115-a may assign, to the one or more POs, available random access preambles including the random access preamble of the random access message 225 associated with one or more ROs, and map the assigned random access preambles to the one or more POs. For example, the UE 115-a may divide available preambles per RO to multiple sets, where each set or specific sets are associated with one or more POs or one or more PUSCH resource units (e.g., a first preamble set may map to a first PUSCH resource unit (or PO) and a second preamble set may map to multiple PUSCH resource units (or multiple POs), and the like). In some examples, the UE 115-a may aggregate multiple PUSCH resource units based one or more factors, for example, such as a latency or a transmit power.

For example, the UE 115-a may map POs to ROs first in a frequency domain and second in a time domain to reduce latency. Alternatively, the UE 115-a may map POs to ROs first in a time domain and second in a frequency domain to increase transmit power. The UE 115-a may map the random access payload of the random access message 225 to one or more of the one or more ROs or the one or more POs in one or more of the time domain or the frequency domain based on a hopping sequence (e.g., a timing hopping sequence, a frequency hopping sequence, or a timing and frequency hopping sequence).

The UE 115-a may, in some examples, map a DMRS or a set of DMRS to random access preambles of PUSCH resource units of the aggregated multiple PUSCH resource units based on a mapping rule between one or more DMRS and preambles. In some examples, each PUSCH resource unit of the aggregated multiple PUSCH resource units may be associated with a unique DMRS or a set of DMRS. Alternatively, the aggregated multiple PUSCH resource units may share a same DMRS or set of DMRS. The base station 105-a may use the DMRS or the set of DMRS to successfully receive and decode the preamble and random access payload of the random access message 225.

In some examples, the UE 115-a may transmit the random access payload of the random access message 225 on a PUSCH using time and frequency resources of the aggregated multiple PUSCH resource units over one or more POs based on a power configuration. For example, the base station 105-a may transmit an indication (e.g., via RRC signaling) of a power configuration that may include a transmit power for the UE 115-a to use when transmitting the random access payload of the random access message 225 on the PUSCH using time and frequency resources of the aggregated multiple PUSCH resource units over one or more POs. In an example, the power configuration may indicate for UE 115-a to use a same transmit power for the aggregated multiple PUSCH resource units.

When supporting both two-step and four-step random access procedures, in some examples, the base station 105-a and the UE 115-a may commence with one random access procedure (e.g., a two-step random access procedure) and fallback to another random access procedure (e.g., a four-step random access procedure), if needed. The base station 105-a may select or assign a priority to a random access procedure based in part on a parameter (e.g., traffic type, network load).

For example, the base station 105-a may configure to use a four-step random access procedure over a two-step random access procedure for some scenarios (e.g., traffic load) to reduce an overhead because the base station 105-a may have to provision for msgA resources for two-step random access procedures that may involve a larger overhead compared to msg1 transmissions with four-step random access procedures.

Additionally, or alternatively, the base station 105-a may select a random access procedure based on a UE 115-a capability to support the random access procedure. For example, if UE 115-a supports both two-step and four-step random access procedures, the base station 105-a may select the two-step or four-step random access procedure to commence the initial access procedure. Otherwise, the base station 105-a may select the random access procedure supported by the UE 115-a.

Returning to the example of random access messaging, the UE 115-a may transmit the random access message 225 to the base station 105-a. The random access message 225 may include a preamble and a PUSCH carrying a random access payload using time and frequency resources of the aggregated multiple PUSCH resource units over the one or more POs, where information in the random access message 225 (e.g., msgA) includes the equivalent contents or aspects of random access message 215 (e.g., msg3 of the four-step random access procedure). An advantage of the two-step random access procedure compared to the four-step random access procedure is that the UE 115-a may be capable of transmitting data (e.g., payload in PUSCH) to the base station 105-a without having to be in a connected state for one data transmission.

The base station 105-a may monitor a PUSCH for a random access preamble or a random access payload of the random access message 225. The random access payload may carry a connection request. In some examples, the base station 105-a may determine an absence of the random access preamble or the random access payload of the random access message 225 based on the monitoring. Absence of the random access preamble or the random access payload of the random access message 225 may result in a random access procedure failure.

In some examples, if the preamble of the random access message 225 is detected, the base station 105-a may transmit a random access response message including an indication to perform a random access fallback procedure (e.g., four-step random access procedure). The UE 115-a may perform the random access fallback procedure based on receiving the random access response message. In some examples, the base station 105-b may request the UE 115-a to retransmit the random access message 225, instead of performing the random access fallback procedure. Alternatively, after successfully receiving the random access message 225, the base station 105-a may construct and transmit the random access response message 230 to the UE 115-a. For example, the base station 105-a may transmit the random access response message 230 to the UE 115-a on a DL-SCH, PDSCH, PDCCH.

The wireless communications systems 200 may support improvements and extending resource usage (e.g., time and frequency resources) for random access messages, among other advantages. As such, supported techniques may include features for efficient random access procedures. The described techniques may also support improved reliability for random access messaging and, in some examples, may promote low latency for random access procedures, among other benefits.

Figure 3:
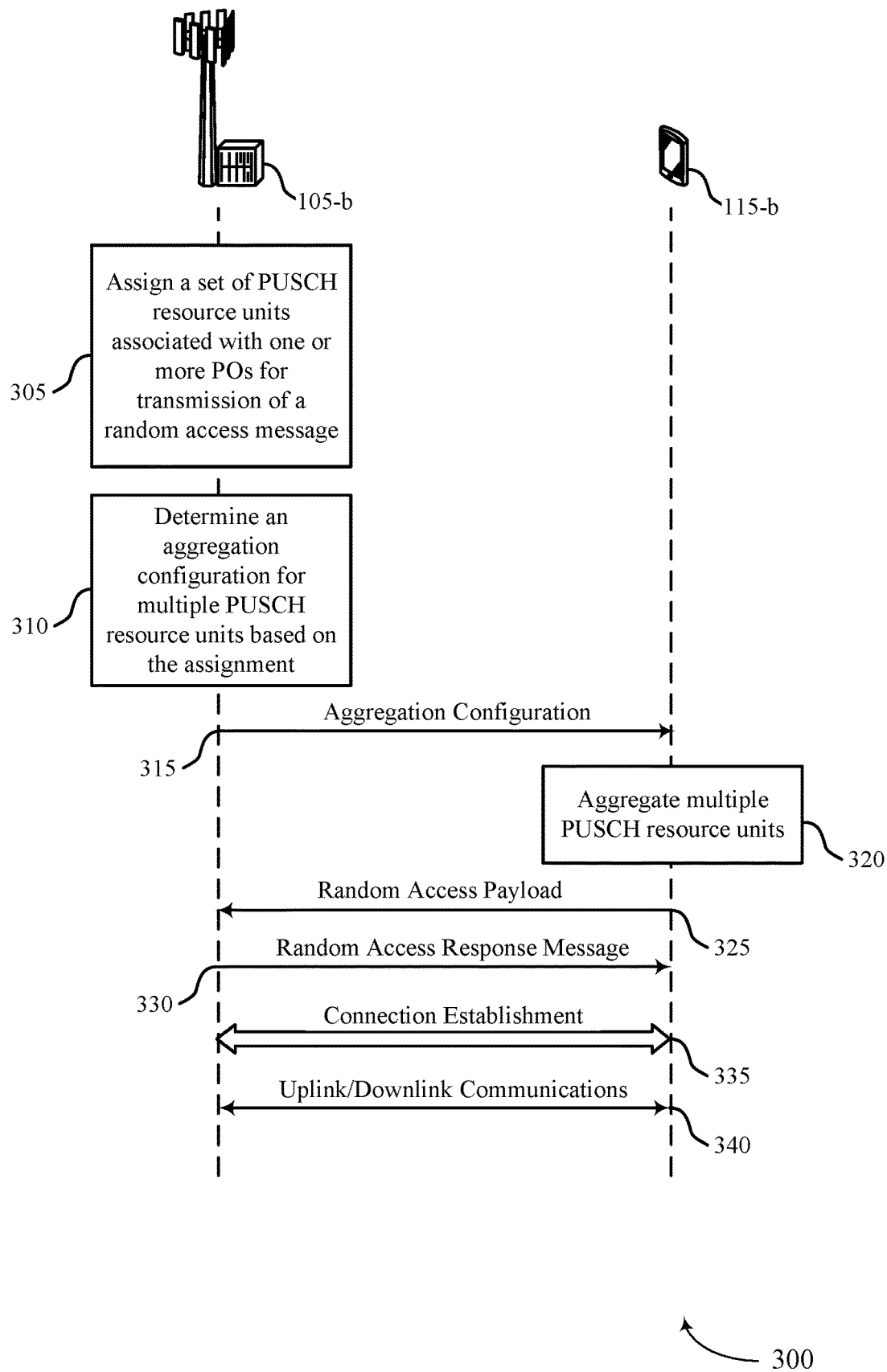
FIG. 3 illustrates an example of a process flow that supports aggregated uplink shared channel transmission for two-step random access channel procedures in accordance with one or more aspects of the present disclosure.

FIG. 3 illustrates an example of a process flow 300 that supports aggregated uplink shared channel transmission for two-step random access channel procedure in accordance with aspects of the present disclosure. The process flow 300 may implement aspects of the wireless communications systems 100 and 200, as described with reference to FIGS. 1, 2A, and 2B. For example, the process flow 300 may be based on a configuration by a base station 105, and implemented by a UE 115 for aggregating multiple PUSCH resources units to support larger payload sizes of random access messages or reduce a modulation and coding scheme of the random access messages, as described herein.

The process flow 300 may include a base station 105-b and a UE 115-b, which may be examples of a base station 105 and a UE 115 as described with reference to FIG. 1. In the following description of the process flow 300, the operations between the base station 105-b and the UE 115-b may be transmitted in a different order than the example order shown, or the operations performed by the base station 105-b and the UE 115-b may be performed in different orders or at different times. Some operations may also be omitted from the process flow 300, and other operations may be added to the process flow 300. In the example of FIG. 3, the base station 105-b and the UE 115-b may be in communication with each other via a terrestrial network. The process flow 300 may support higher data rates, improved random access messaging support for the UE 115-b, among other benefits.

In some examples, the process flow 300 may be part of a random access procedure to establish a connection between the base station 105-*b* and the UE 115-*b*. The base station 105-*b* and the UE 115-*b* may support multiple radio access technologies including 4G systems such as LTE systems, LTE-A systems, or LTE-A Pro systems, and 5G systems which may be referred to as NR systems. The random access procedure may correspond to, for example, at least one of the above example radio access technologies. In FIG. 3, by way of example, the random access procedure may be a two-step or four-step random access procedure related to 4G or 5G systems.

At 305, the base station 105-*b* may assign a set of PUSCH resource units associated with one or more POs for transmission of a random access message, which may include a random access preamble and a random access payload. At 310, the base station 105-*b* may determine an aggregation configuration for multiple PUSCH resource units based on the assignment. At 315, the base station 105-*b* may transmit the aggregation configuration to the UE 115-*b*, for example, via RRC signaling.

At 320, the UE 115-*b* may aggregate multiple PUSCH resource units. For example, the UE 115-*b* may aggregate, using the aggregation configuration, multiple PUSCH resource units of a set of PUSCH resource units associated with one or more POs based on one or more of a payload size of the random access payload or a modulation and coding scheme associated with the random access payload. At 325, the UE 115-*b* may transmit the random access payload of the random access message (e.g., msgA) on a PUSCH using time and frequency resources of the aggregated multiple PUSCH resource units over the one or more POs.

At 330, the base station 105-*b* may transmit a random access response message (which may also be referred to as msgB) to the UE 115-*b*. The msgB may be a random access response to the received msgA, including a random access preamble and the random access payload from the UE 115-*b*. In some examples, the base station 105-*b* may transmit the msgB to the UE 115-*b* based on a UE contention resolution identifier, a random access radio network temporary identifier (RA-RNTI), or the like. For example, as part of the random access procedure, the base station 105-*b* may transmit the msgB on a PDCCH or PDSCH according to the RA-RNTI.

At 335, the process flow 300 may proceed with the base station 105-*b* and the UE 115-*b* establishing the connection. At 340, the process flow 300 may proceed with the base station 105-*b* and the UE 115-*b* communicating uplink and downlink communications, for example, such as control information, data, and the like.

The operations performed by the base station 105-*b* and the UE 115-*b* as part of, but not limited to, process flow 300 may provide improvements to UE 115-*b* resource usage and allocation for random access messages. Further, the operations performed by the base station 105-*b* and the UE 115-*b* as part of, but not limited to, process flow 300 may provide benefits and enhancements to the operation of the UE 115-*b*. For example, the described aggregation of multiple PUSCH resources units in the process flow 300 may support improved data rates and enhanced random access messaging reliability, among other advantages.

Figure 4:
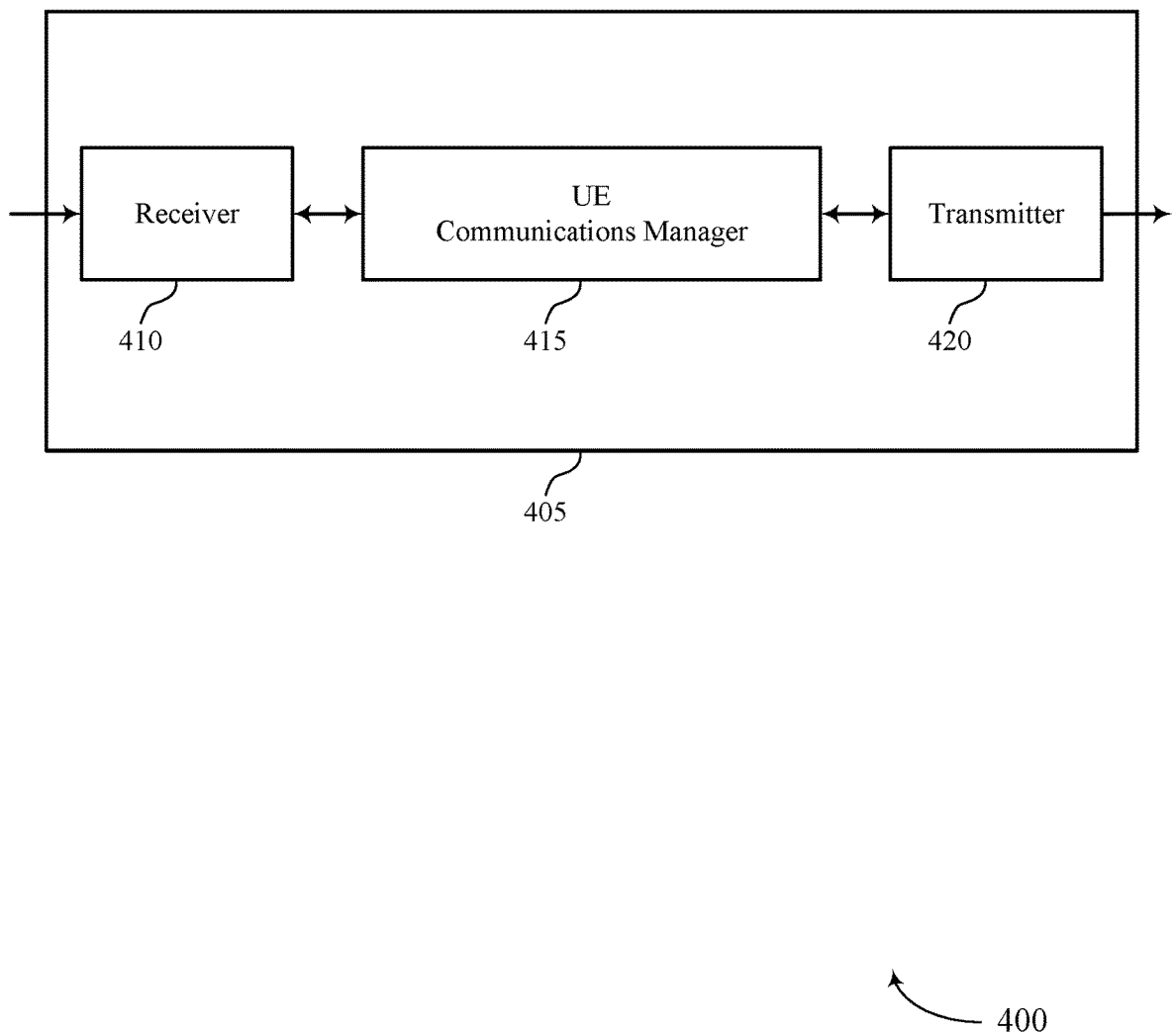
FIGS. 4 and 5 show block diagrams of devices that support aggregated uplink shared channel transmission for two-step random access channel procedure in accordance with aspects of the present disclosure.

FIG. 4 shows a block diagram 400 of a device 405 that supports aggregated uplink shared channel transmission for two-step random access channel procedure in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to aggregated uplink shared channel transmission for two-step random access channel procedure, or the like). Information may be passed on to other components of the device 405. The receiver 410 may be an example of aspects of the transceiver 720 described with reference to FIG. 7. The receiver 410 may utilize a single antenna or a set of antennas.

The UE communications manager 415 may identify a random access message of a random access procedure, the random access message including a random access preamble and a random access payload. The UE communications manager 415 may aggregate multiple PUSCH units of a set of PUSCH resource units associated with one or more POs based on one or more of a payload size of the random access payload or a modulation and coding scheme associated with the random access payload. The UE communications manager 415 may transmit the random access payload of the random access message on a PUSCH using time and frequency resources of the aggregated multiple PUSCH resource units over the one or more POs. One example advantage of aggregating multiple PUSCH units of a set of PUSCH resource units associated with one or more POs based on one or more of a payload size of the random access payload or a modulation and coding scheme associated with the random access payload may include lower latency relating to communications in random access procedures, as well as extending random access messaging capability and reliability. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
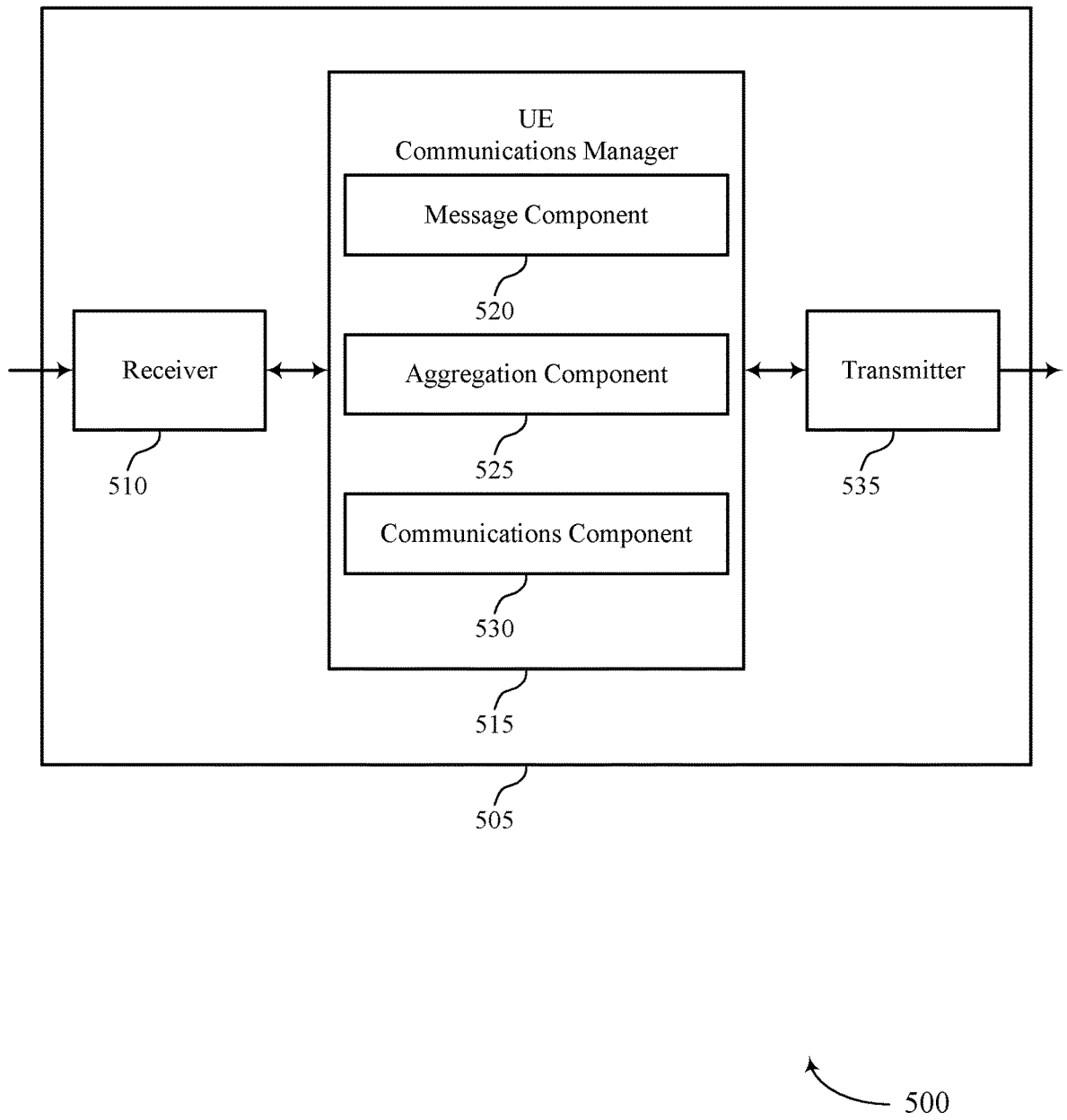

FIG. 5 shows a block diagram 500 of a device 505 that supports aggregated uplink shared channel transmission for two-step random access channel procedure in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to aggregated uplink shared channel transmission for two-step random access channel procedure, or the like). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a message component 520, an aggregation component 525, and a communications component 530. The UE communications manager 515 may be an example of aspects of the UE communications manager 710 described herein. The message component 520 may identify a random access message of a random access procedure, the random access message including a random access preamble and a random access payload. The aggregation component 525 may aggregate multiple PUSCH resource units of a set of PUSCH resource units associated with one or more POs based on one or more of a payload size of the random access payload or a modulation and coding scheme associated with the random access payload. The communications component 530 may transmit the random access payload of the random access message on a PUSCH using time and frequency resources of the aggregated multiple PUSCH resource units over the one or more POs. Based on aggregating multiple PUSCH resource units of a set of PUSCH resource units associated with one or more POs, a processor of a UE 115 (e.g., controlling the receiver 710, the transmitter 740, or the transceiver 1120 as described with reference to FIG. 11) may efficiently transmit the random access payload of the random access message on a PUSCH using time and frequency resources of the aggregated multiple PUSCH resource units over the one or more POs. The processor of the UE 115 may turn on one or more processing units for transmitting the random access payload of the random access message, increase a processing clock, or a similar mechanism within the UE 115. As such, when the random access payload of the random access message is transmitted, the processor may be ready to respond more efficiently through the reduction of a ramp up in processing power.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
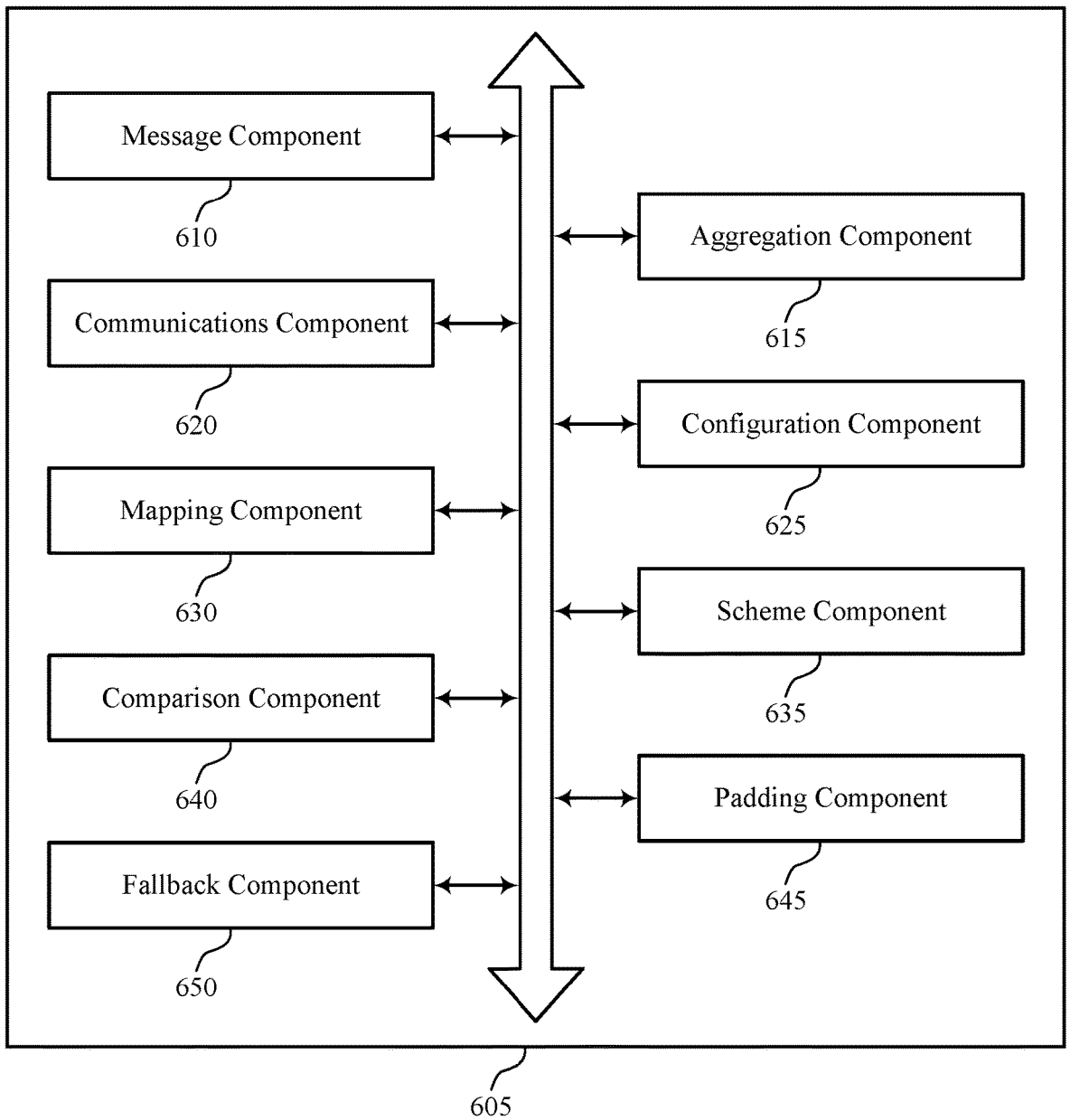
FIG. 6 shows a block diagram of a UE communications manager that supports aggregated uplink shared channel transmission for two-step random access channel procedure in accordance with aspects of the present disclosure.

FIG. 6 shows a block diagram 600 of a UE communications manager 605 that supports aggregated uplink shared channel transmission for two-step random access channel procedure in accordance with aspects of the present disclosure. The UE communications manager 605 may be an example of aspects of a UE communications manager 415, a UE communications manager 515, or a UE communications manager 710 described herein. The UE communications manager 605 may include a message component 610, an aggregation component 615, a communications component 620, a configuration component 625, a mapping component 630, a scheme component 635, a comparison component 640, a padding component 645, and a fallback component 650. Each of these modules may communicate, directly or indirectly, with one another (e.g., via one or more buses).

The message component 610 may identify a random access message of a random access procedure, the random access message including a random access preamble and a random access payload. In some cases, the random access procedure includes a twostep random access procedure. In some examples, receiving a random access response message may include receiving an indication to perform a random access fallback procedure, where the random access fallback procedure includes a four-step random access procedure. In some examples, the message component 610 may receive a random access response message including an indication to retransmit the random access message.

The aggregation component 615 may aggregate multiple PUSCH resource units of a set of PUSCH resource units associated with one or more POs based on one or more of a payload size of the random access payload or a modulation and coding scheme associated with the random access payload. In some cases, one or more PUSCH resource units of the set of PUSCH resource units have a default payload size. In some cases, the default payload size includes one or more bits. In some cases, a PUSCH resource unit of the set of PUSCH resource units spans a PO. In some cases, the aggregated multiple PUSCH resource units span over multiple POs.

The communications component 620 may transmit the random access payload of the random access message on a PUSCH using time and frequency resources of the aggregated multiple PUSCH resource units over the one or more POs. In some examples, the communications component 620 may transmit the random access payload of the random access message on time and frequency resources of the aggregated multiple PUSCH resource units using a same modulation and coding scheme for each PUSCH resource unit of the aggregated multiple PUSCH resource units. In some examples, the communications component 620 may transmit the random access payload of the random access message on a PUSCH using time and frequency resources using time and frequency resources that are consecutive or non-consecutive in one or more of a time domain or a frequency domain. In some examples, the communications component 620 may retransmit the random access message based on a random access response message.

The configuration component 625 may receive, from a base station, an indication of an aggregation configuration for the PUSCH resource units. In some examples, aggregating the multiple PUSCH resource units of the set of PUSCH resource units may be further based on the aggregation configuration. In some examples, the configuration component 625 may receive RRC signaling. In some examples, the configuration component 625 may receive one or more of a RAR window for a random access response associated with the random access procedure or a retransmission period of the random access message.

In some examples, the configuration component 625 may receive, from a base station, an indication of one or more of an RO configuration or a PO configuration. In some cases, the RO configuration may include one or more of a periodicity of an RO, a time and frequency resource allocation of the RO, a preamble sequence configuration for a CBRA procedure or a CFRA procedure, an association rule between ROs and POs, or a beam association rule between an SSB or a CSI-RS and the RO. In some cases, the PO configuration may include one or more of a periodicity of a PO, a time and frequency resource allocation of the PO or a PUSCH resource unit, a DMRS configuration, a PUSCH waveform configuration, beam management information for the PUSCH.

In some examples, the configuration component 625 may receive, from a base station, an indication of a power configuration, where transmitting the random access payload of the random access message on the PUSCH using time and frequency resources of the aggregated multiple PUSCH resource units over the one or more POs includes transmitting the random access payload of the random access message on time and frequency resources of the aggregated multiple PUSCH resource units using a same transmit power for each PUSCH resource unit of the aggregated multiple PUSCH resource units.

The mapping component 630 may map one or more ROs to the one or more POs based on the one or more of RO configuration or the PO configuration. In some examples, the mapping component 630 may map the random access preamble to the one or more POs in one or more of the time domain or the frequency domain based on the RO configuration or the PO configuration. In some examples, the mapping component 630 may assign, to the one or more POs, available random access preambles including the random access preamble of the random access message associated with one or more ROs. In some examples, the mapping component 630 may map the assigned random access preambles to the one or more POs. In some examples, the mapping component 630 may map the random access payload to one or more of the one or more ROs or the one or more POs in one or more of the time domain or the frequency domain based on a hopping sequence.

In some examples, the mapping component 630 may map a set of DMRS to random access preambles of PUSCH resource units of the aggregated multiple PUSCH resource units based on a mapping rule. In some cases, one or more of the one or more ROs or the one or more POs are contiguous in one or more of the time domain or the frequency domain. In some cases, one or more of the one or more ROs or the one or more POs are noncontiguous in one or more of the time domain or the frequency domain. In some cases, each PUSCH resource unit of the aggregated multiple PUSCH resource units are associated with a unique DMRS of the set of DMRSs. In some cases, the aggregated multiple PUSCH resource units share a same DMRS of the set of DMRS.

The scheme component 635 may determine a modulation and coding scheme capability for the random access message including the random access preamble and the random access payload. In some examples, aggregating the multiple PUSCH resource units of the set of PUSCH resource units associated with the one or more POs is further based on the modulation and coding scheme capability. In some examples, the scheme component 635 may transmit, in one or more of the random access preamble or a control portion of the random access payload, an indication of the time and frequency resources of the aggregated multiple PUSCH resource units based on the modulation and coding scheme capability supporting the multiple modulation and coding schemes. In some cases, a payload size of one or more PUSCH resource units of the set of PUSCH resource units is fixed based on the modulation and coding scheme capability supporting a single modulation and coding scheme. In some cases, a payload size of one or more PUSCH resource units of the set of PUSCH resource units is variable based on the modulation and coding scheme capability supporting multiple modulation and coding schemes.

The comparison component 640 may compare the payload size of the random access payload to an aggregated payload size of the aggregated multiple PUSCH resource units. In some examples, the comparison component 640 may determine a quantity of unused bits of the aggregated payload size of the aggregated multiple PUSCH resource units based on the comparing. The padding component 645 may pad each unused bit of the quantity of unused bits of the aggregated payload size of the aggregated multiple PUSCH resource units with a null bit. The fallback component 650 may perform the random access fallback procedure based on receiving the random access response message.

Figure 7:
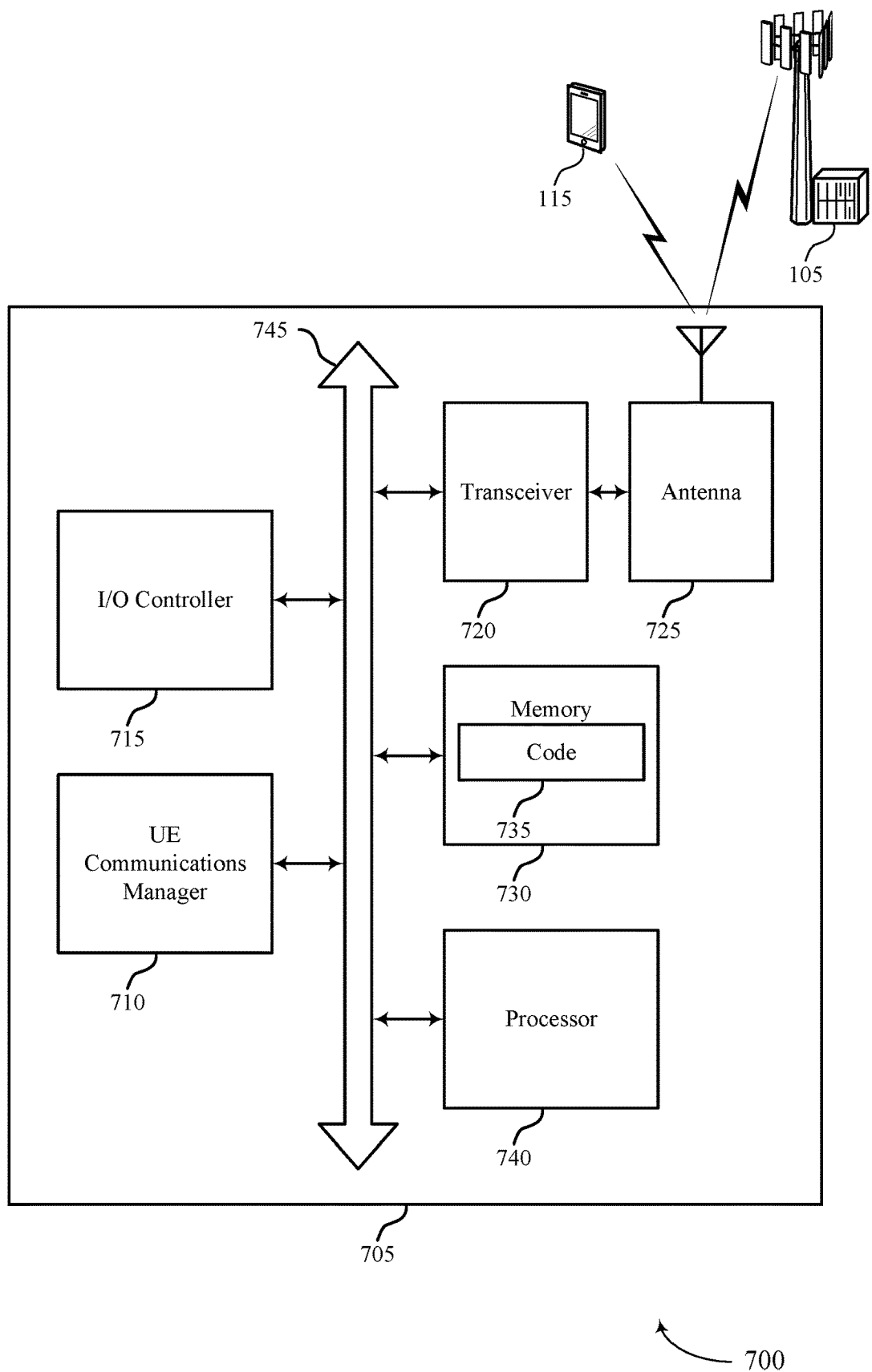
FIG. 7 shows a diagram of a system including a device that supports aggregated uplink shared channel transmission for two-step random access channel procedure in accordance with aspects of the present disclosure.

FIG. 7 shows a diagram of a system 700 including a device 705 that supports aggregated uplink shared channel transmission for two-step random access channel procedure in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may identify a random access message of a random access procedure, the random access message including a random access preamble and a random access payload. The UE communications manager 710 may aggregate multiple PUSCH resource units of a set of PUSCH resource units associated with one or more POs based on one or more of a payload size of the random access payload or a modulation and coding scheme associated with the random access payload. The UE communications manager 710 may transmit the random access payload of the random access message on a PUSCH using time and frequency resources of the aggregated multiple PUSCH resource units over the one or more POs.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS, ANDROID, MS-DOS, MS-WINDOWS, OS/2, UNIX, LINUX, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/basic output system (BIOS) which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting aggregated uplink shared channel transmission for two-step random access channel procedure).

Figure 8:
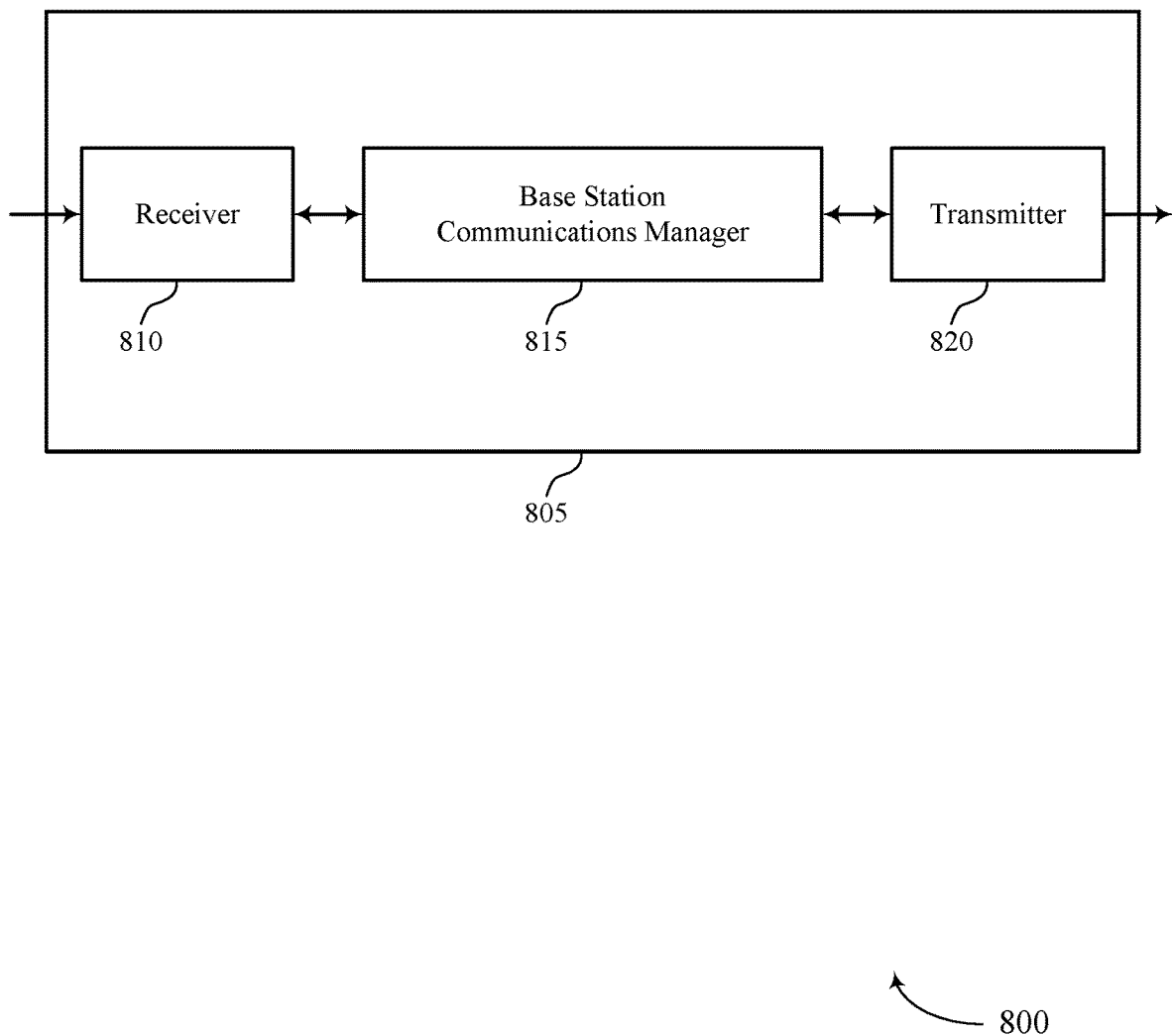
FIGS. 8 and 9 show block diagrams of devices that support aggregated uplink shared channel transmission for two-step random access channel procedure in accordance with aspects of the present disclosure.

FIG. 8 shows a block diagram 800 of a device 805 that supports aggregated uplink shared channel transmission for two-step random access channel procedure in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to aggregated uplink shared channel transmission for two-step random access channel procedure, or the like). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may assign a set of PUSCH resource units associated with one or more POs for transmission of a random access payload of a random access message associated with a random access procedure. The base station communications manager 815 may determine an aggregation configuration for multiple PUSCH resource units of the set of PUSCH resource units based on assigning the set of PUSCH resource units. The base station communications manager 815 may transmit, to a UE, an indication of the aggregation configuration for the multiple PUSCH resource units. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
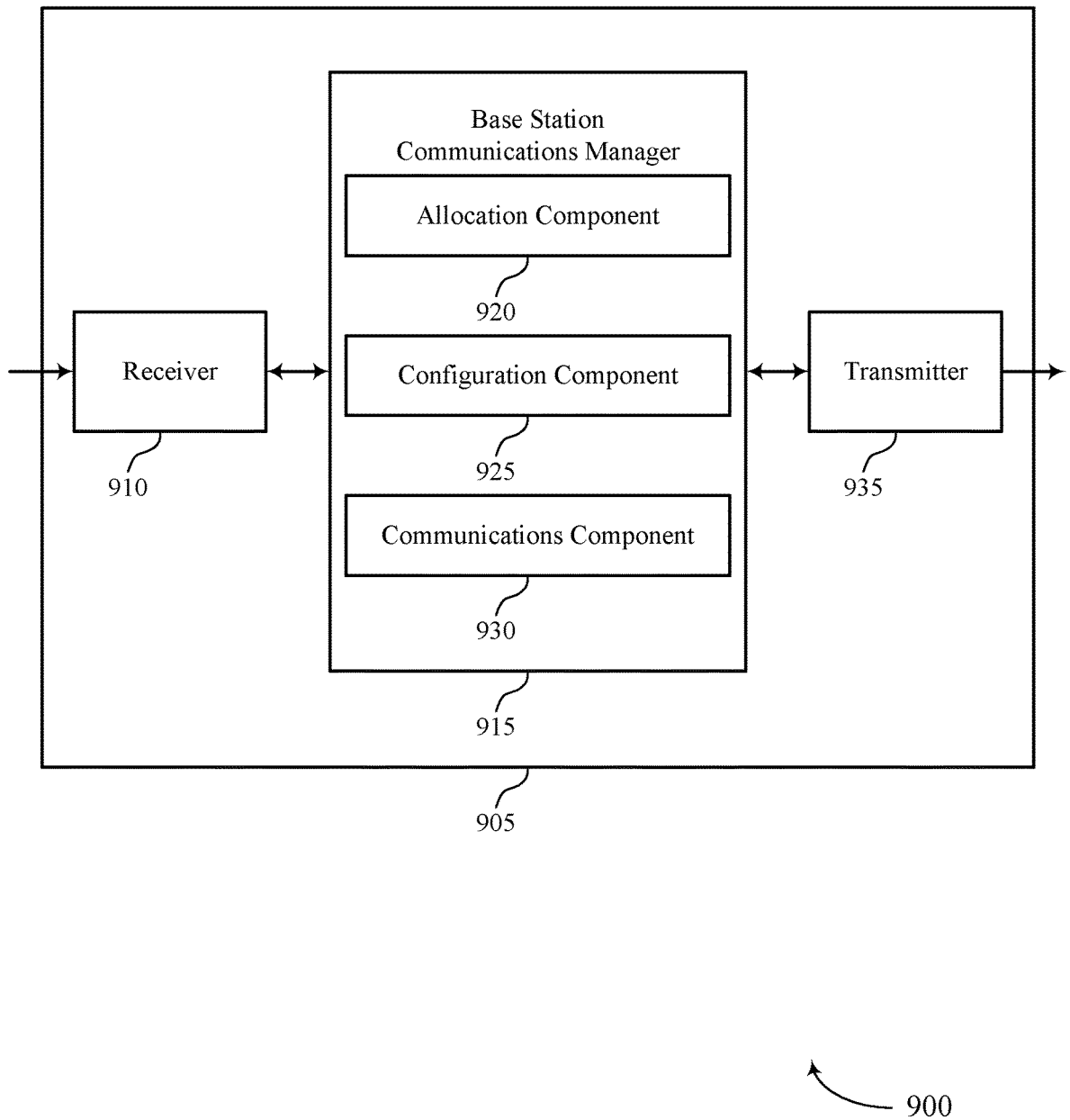

FIG. 9 shows a block diagram 900 of a device 905 that supports aggregated uplink shared channel transmission for two-step random access channel procedure in accordance with aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to aggregated uplink shared channel transmission for two-step random access channel procedure, or the like). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include an allocation component 920, a configuration component 925, and a communications component 930. The base station communications manager 915 may be an example of aspects of the base station communications manager 1110 described herein. The allocation component 920 may assign a set of PUSCH resource units associated with one or more POs for transmission of a random access payload of a random access message associated with a random access procedure. The configuration component 925 may determine an aggregation configuration for multiple PUSCH resource units of the set of PUSCH resource units based on assigning the set of PUSCH resource units. The communications component 930 may transmit, to a UE, an indication of the aggregation configuration for the multiple PUSCH resource units.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
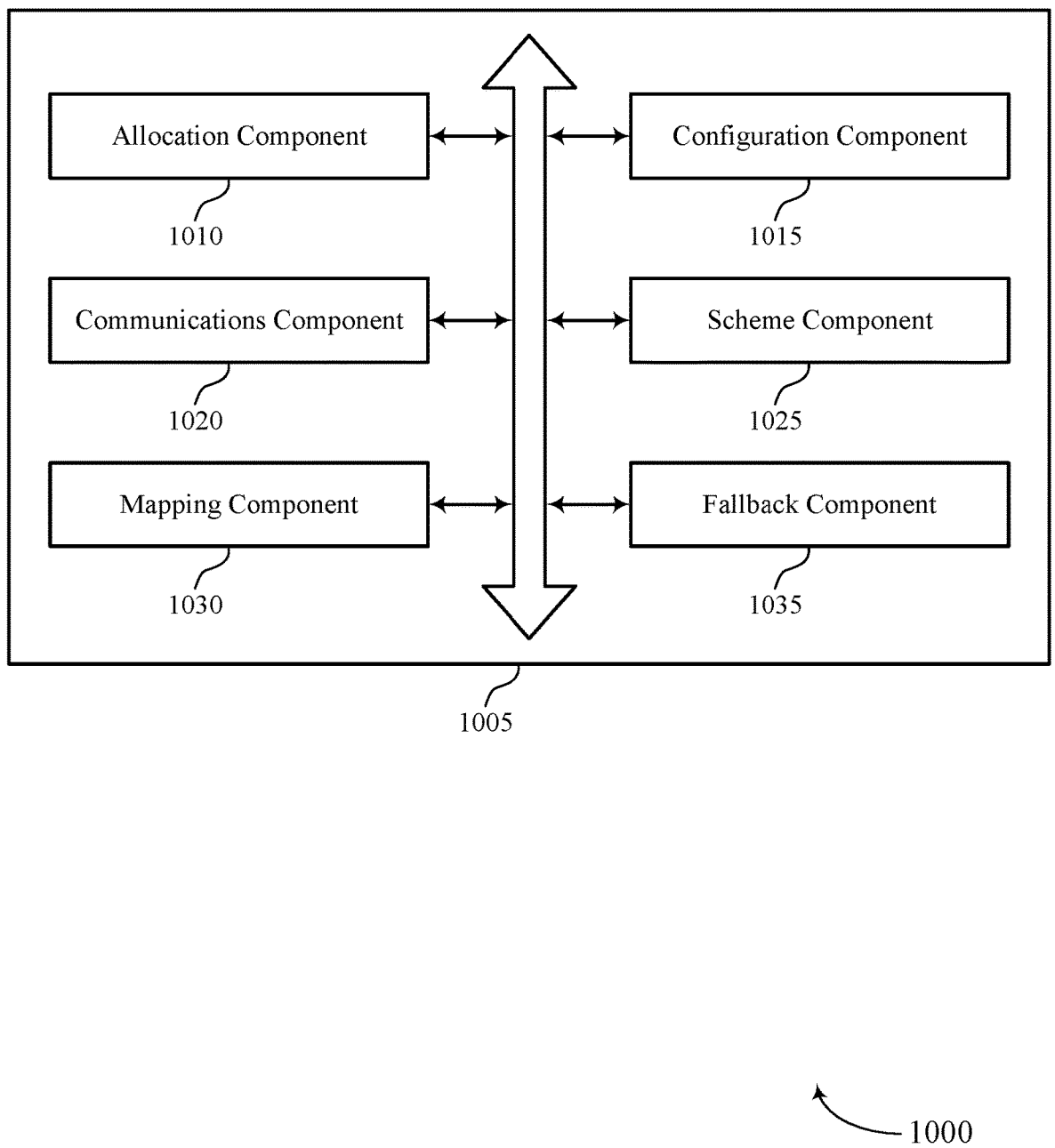
FIG. 10 shows a block diagram of a base station communications manager that supports aggregated uplink shared channel transmission for two-step random access channel procedure in accordance with aspects of the present disclosure.

FIG. 10 shows a block diagram 1000 of a base station communications manager 1005 that supports aggregated uplink shared channel transmission for two-step random access channel procedure in accordance with aspects of the present disclosure. The base station communications manager 1005 may be an example of aspects of a base station communications manager 815, a base station communications manager 915, or a base station communications manager 1110 described herein. The base station communications manager 1005 may include an allocation component 1010, a configuration component 1015, a communications component 1020, a scheme component 1025, a mapping component 1030, and a fallback component 1035. Each of these modules may communicate, directly or indirectly, with one another (e.g., via one or more buses).

The allocation component 1010 may assign a set of PUSCH resource units associated with one or more POs for transmission of a random access payload of a random access message associated with a random access procedure. In some cases, one or more PUSCH resource units of the set of PUSCH resource units may have a default payload size. In some cases, the default payload size includes one or more bits. In some cases, the random access procedure includes a two-step random access procedure. In some cases, a PUSCH resource unit of the set of PUSCH resource units spans a PO. In some cases, the aggregated multiple PUSCH resource units span over multiple POs.

The configuration component 1015 may determine an aggregation configuration for multiple PUSCH resource units of the set of PUSCH resource units based on assigning the set of PUSCH resource units. In some examples, the configuration component 1015 may transmit, to the UE, a second indication of one or more of an RO configuration or a PO configuration. In some examples, configuration component 1015 may transmit, to the UE, a second indication of a power configuration, where receiving the random access payload of the random access message on the PUSCH using time and frequency resources of the aggregated multiple PUSCH resource units over the one or more POs includes receiving the random access payload of the random access message on time and frequency resources of the aggregated multiple PUSCH resource units using a same power configuration for each PUSCH resource unit of the aggregated multiple PUSCH resource units. In some cases, the RO configuration may include one or more of: a periodicity of an RO, a time and frequency resource allocation of the RO, a preamble sequence configuration for a CBRA procedure or a CFRA procedure, an association rule between ROs and POs, or a beam association rule between an SSB or a CSI-RS and the RO. In some cases, the PO configuration may include one or more of: a periodicity of a PO, a time and frequency resource allocation of the PO or a PUSCH resource unit, a DMRS configuration, a PUSCH waveform configuration, beam management information for a PUSCH.

The communications component 1020 may transmit, to a UE, an indication of the aggregation configuration for the multiple PUSCH resource units. In some examples, the communications component 1020 may transmit RRC signaling. In some examples, the communications component 1020 may transmit one or more of a RAR window for a random access response associated with the random access procedure or a retransmission period of the random access message. In some examples, the communications component 1020 may receive, from the UE, the random access payload of the random access message on a PUSCH using time and frequency resources of aggregated multiple PUSCH resource units over one or more POs.

The scheme component 1025 may receive, from the UE, a modulation and coding scheme capability for the random access message including the random access preamble and the random access payload. In some examples, determining the aggregation configuration for the multiple PUSCH resource units of the set of PUSCH resource units may be further based on the modulation and coding scheme capability. The mapping component 1030 may map one or more ROs to the one or more POs based on the one or more of RO configuration or the PO configuration. In some examples, the mapping component 1030 may map the random access preamble to the one or more POs in one or more of the time domain or the frequency domain based on the RO configuration or the PO configuration. In some cases, one or more of the one or more ROs or the one or more POs are noncontiguous in one or more of the time domain or the frequency domain. In some cases, one or more of the one or more ROs or the one or more POs are contiguous in one or more of the time domain or the frequency domain.

The fallback component 1035 may transmit a random access response message including an indication to perform a random access fallback procedure, where the random access fallback procedure includes a four-step random access procedure. In some examples, the fallback component 1035 may perform the random access fallback procedure based on the random access response message. In some examples, the fallback component 1035 may transmit a random access response message including an indication to the UE to retransmit the random access message.

Figure 11:
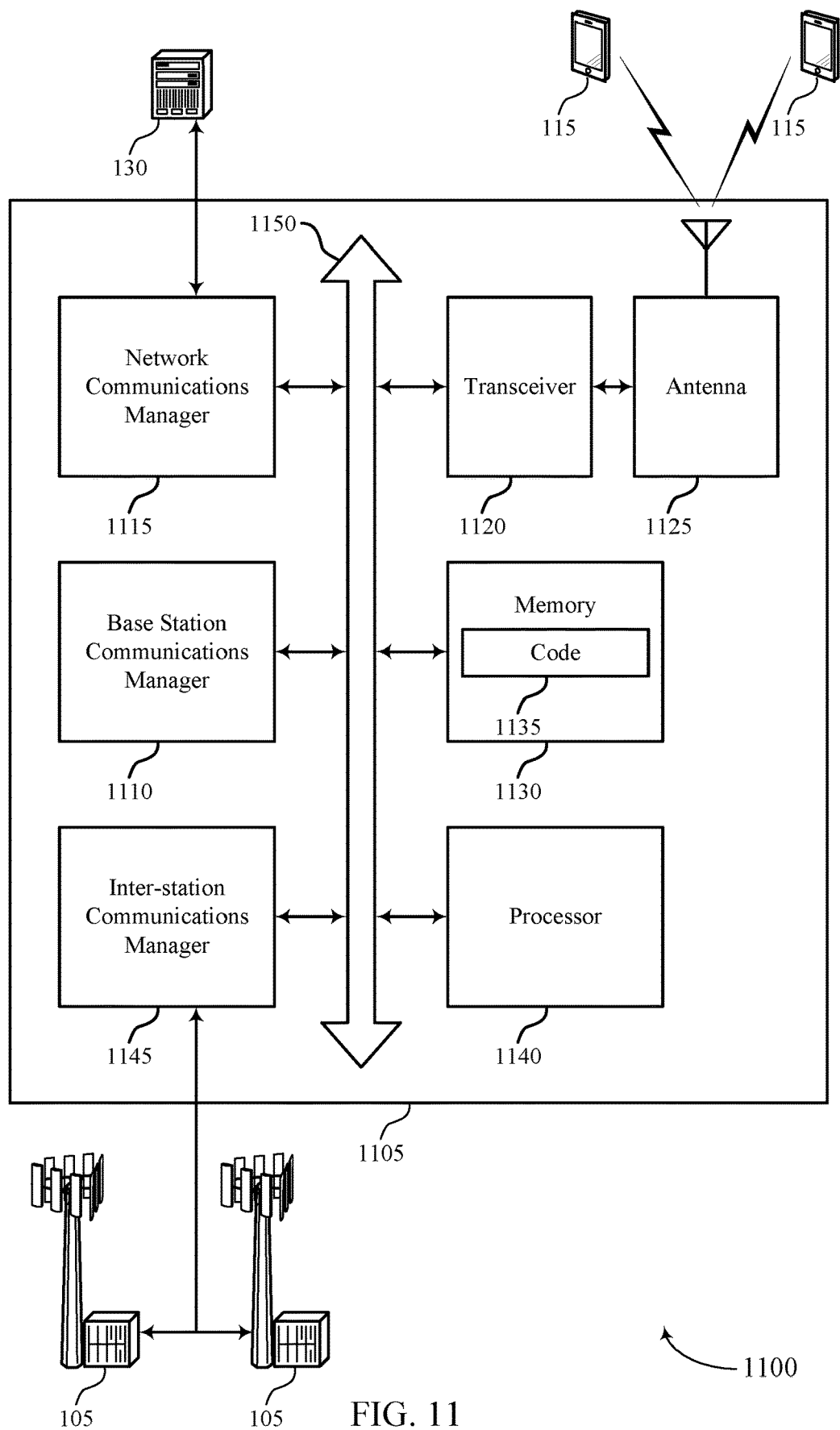
FIG. 11 shows a diagram of a system including a device that supports aggregated uplink shared channel transmission for two-step random access channel procedure in accordance with aspects of the present disclosure.

FIG. 11 shows a diagram of a system 1100 including a device 1105 that supports aggregated uplink shared channel transmission for two-step random access channel procedure in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may assign a set of PUSCH resource units associated with one or more POs for transmission of a random access payload of a random access message associated with a random access procedure. The base station communications manager 1110 may determine an aggregation configuration for multiple PUSCH resource units of the set of PUSCH resource units based on assigning the set of PUSCH resource units. The base station communications manager 1110 may transmit, to a UE, an indication of the aggregation configuration for the multiple PUSCH resource units.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting aggregated uplink shared channel transmission for two-step random access channel procedure).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

Figure 12:
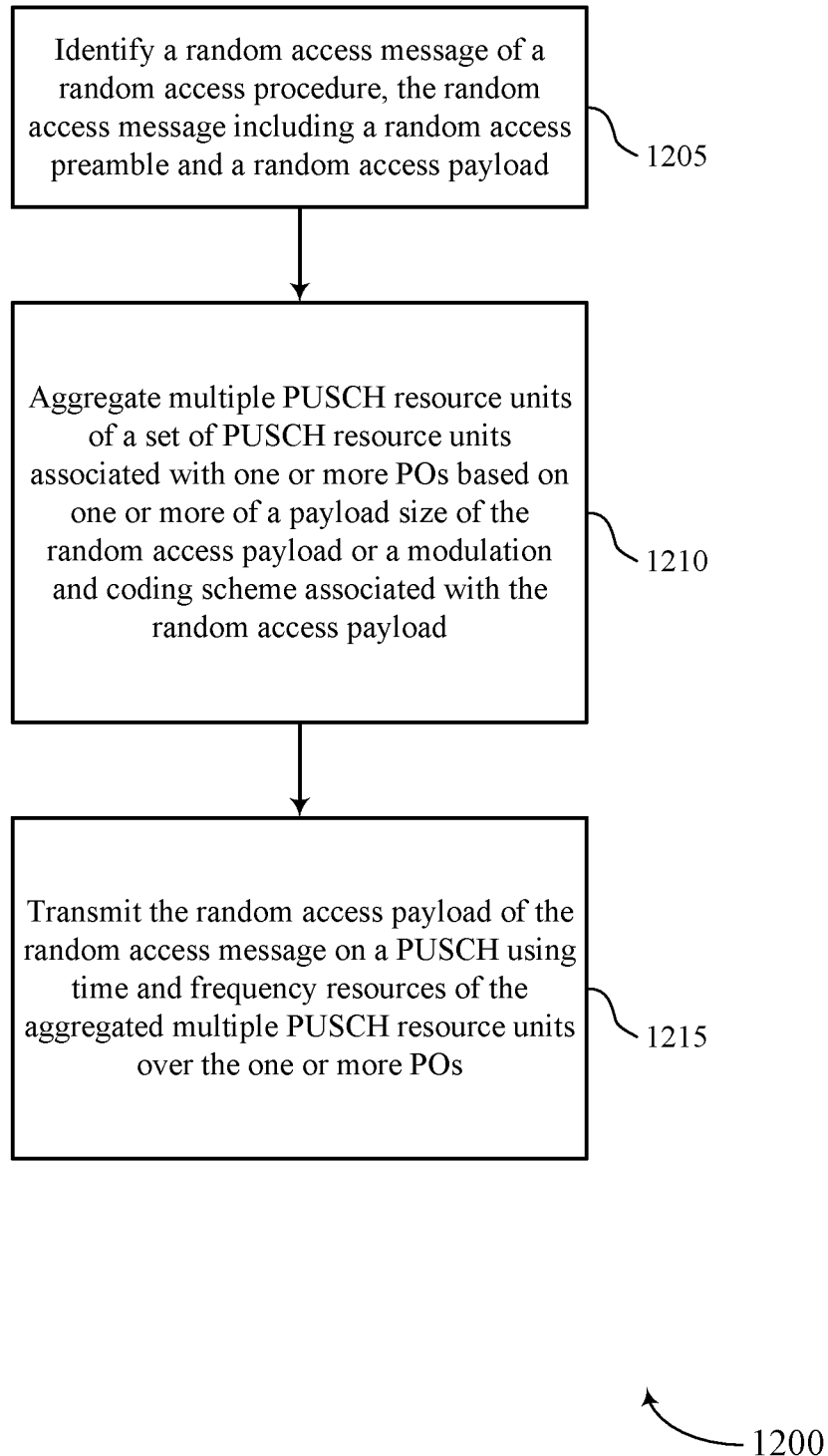
FIGS. 12 through 15 show flowcharts illustrating methods that support aggregated uplink shared channel transmission for two-step random access channel procedure in accordance with aspects of the present disclosure.

FIG. 12 shows a flowchart illustrating a method 1200 that supports aggregated uplink shared channel transmission for two-step random access channel procedure in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may identify a random access message of a random access procedure, the random access message including a random access preamble and a random access payload. The operations of 1205 may be performed according to the methods described herein. In some examples, aspects of the operations of 1205 may be performed by a message component as described with reference to FIGS. 4 through 7.

At 1210, the UE may aggregate multiple PUSCH resource units of a set of PUSCH resource units associated with one or more POs based on one or more of a payload size of the random access payload or a modulation and coding scheme associated with the random access payload. The operations of 1210 may be performed according to the methods described herein. In some examples, aspects of the operations of 1210 may be performed by an aggregation component as described with reference to FIGS. 4 through 7.

At 1215, the UE may transmit the random access payload of the random access message on a PUSCH using time and frequency resources of the aggregated multiple PUSCH resource units over the one or more POs. The operations of 1215 may be performed according to the methods described herein. In some examples, aspects of the operations of 1215 may be performed by a communications component as described with reference to FIGS. 4 through 7.

Figure 13:
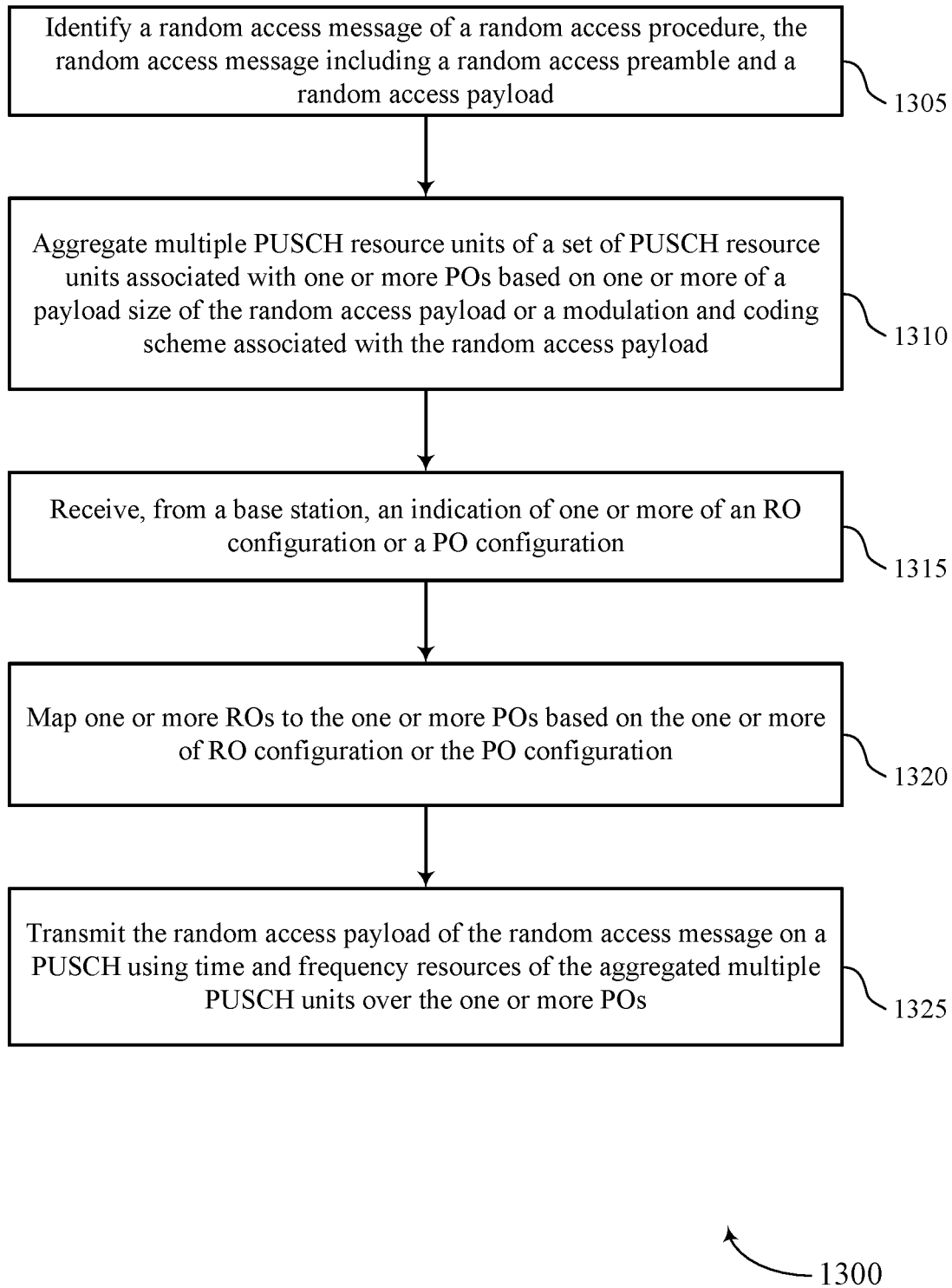

FIG. 13 shows a flowchart illustrating a method 1300 that supports aggregated uplink shared channel transmission for two-step random access channel procedure in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described herein.

Additionally or alternatively, a UE may perform aspects of the functions described herein using special-purpose hardware.

At 1305, the UE may identify a random access message of a random access procedure, the random access message including a random access preamble and a random access payload. The operations of 1305 may be performed according to the methods described herein. In some examples, aspects of the operations of 1305 may be performed by a message component as described with reference to FIGS. 4 through 7.

At 1310, the UE may aggregate multiple PUSCH resource units of a set of PUSCH resource units associated with one or more POs based on one or more of a payload size of the random access payload or a modulation and coding scheme associated with the random access payload. The operations of 1310 may be performed according to the methods described herein. In some examples, aspects of the operations of 1310 may be performed by an aggregation component as described with reference to FIGS. 4 through 7.

At 1315, the UE may receive, from a base station, an indication of one or more of an RO configuration or a PO configuration. The operations of 1315 may be performed according to the methods described herein. In some examples, aspects of the operations of 1315 may be performed by a configuration component as described with reference to FIGS. 4 through 7.

At 1320, the UE may map one or more ROs to the one or more POs based on the one or more of RO configuration or the PO configuration. The operations of 1320 may be performed according to the methods described herein. In some examples, aspects of the operations of 1320 may be performed by a mapping component as described with reference to FIGS. 4 through 7.

At 1325, the UE may transmit the random access payload of the random access message on a PUSCH using time and frequency resources of the aggregated multiple PUSCH resource units over the one or more POs. The operations of 1325 may be performed according to the methods described herein. In some examples, aspects of the operations of 1325 may be performed by a communications component as described with reference to FIGS. 4 through 7.

Figure 14:
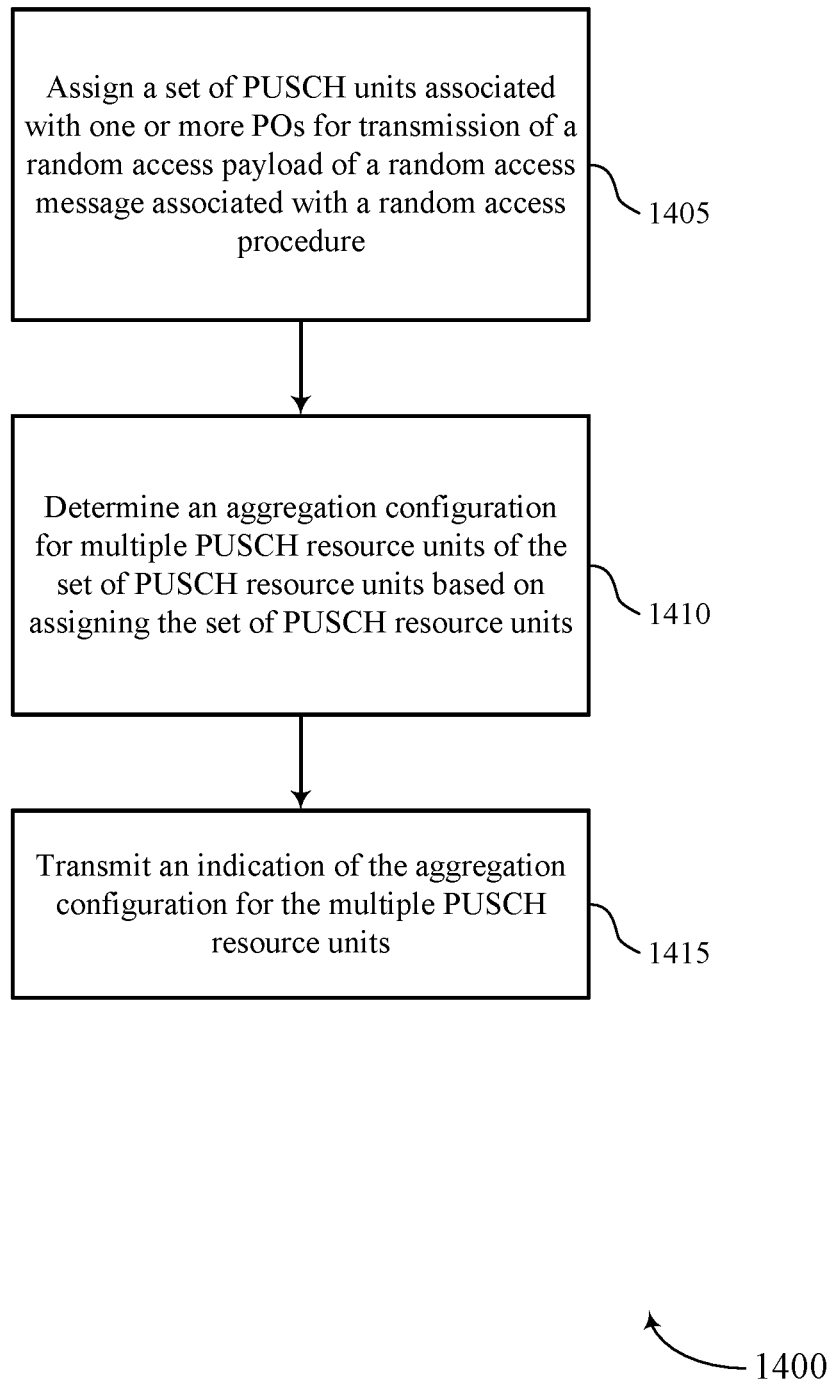

FIG. 14 shows a flowchart illustrating a method 1400 that supports aggregated uplink shared channel transmission for two-step random access channel procedure in accordance with aspects of the present disclosure. The operations of method 1400 may be implemented by a base station 105 or its components as described herein. For example, the operations of method 1400 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may assign a set of PUSCH resource units associated with one or more POs for transmission of a random access payload of a random access message associated with a random access procedure. The operations of 1405 may be performed according to the methods described herein. In some examples, aspects of the operations of 1405 may be performed by an allocation component as described with reference to FIGS. 8 through 11.

At 1410, the base station may determine an aggregation configuration for multiple PUSCH resource units of the set of PUSCH resource units based on assigning the set of PUSCH resource units. The operations of 1410 may be performed according to the methods described herein. In some examples, aspects of the operations of 1410 may be performed by a configuration component as described with reference to FIGS. 8 through 11.

At 1415, the base station may transmit an indication of the aggregation configuration for the multiple PUSCH resource units. The operations of 1415 may be performed according to the methods described herein. In some examples, aspects of the operations of 1415 may be performed by a communications component as described with reference to FIGS. 8 through 11.

Figure 15:
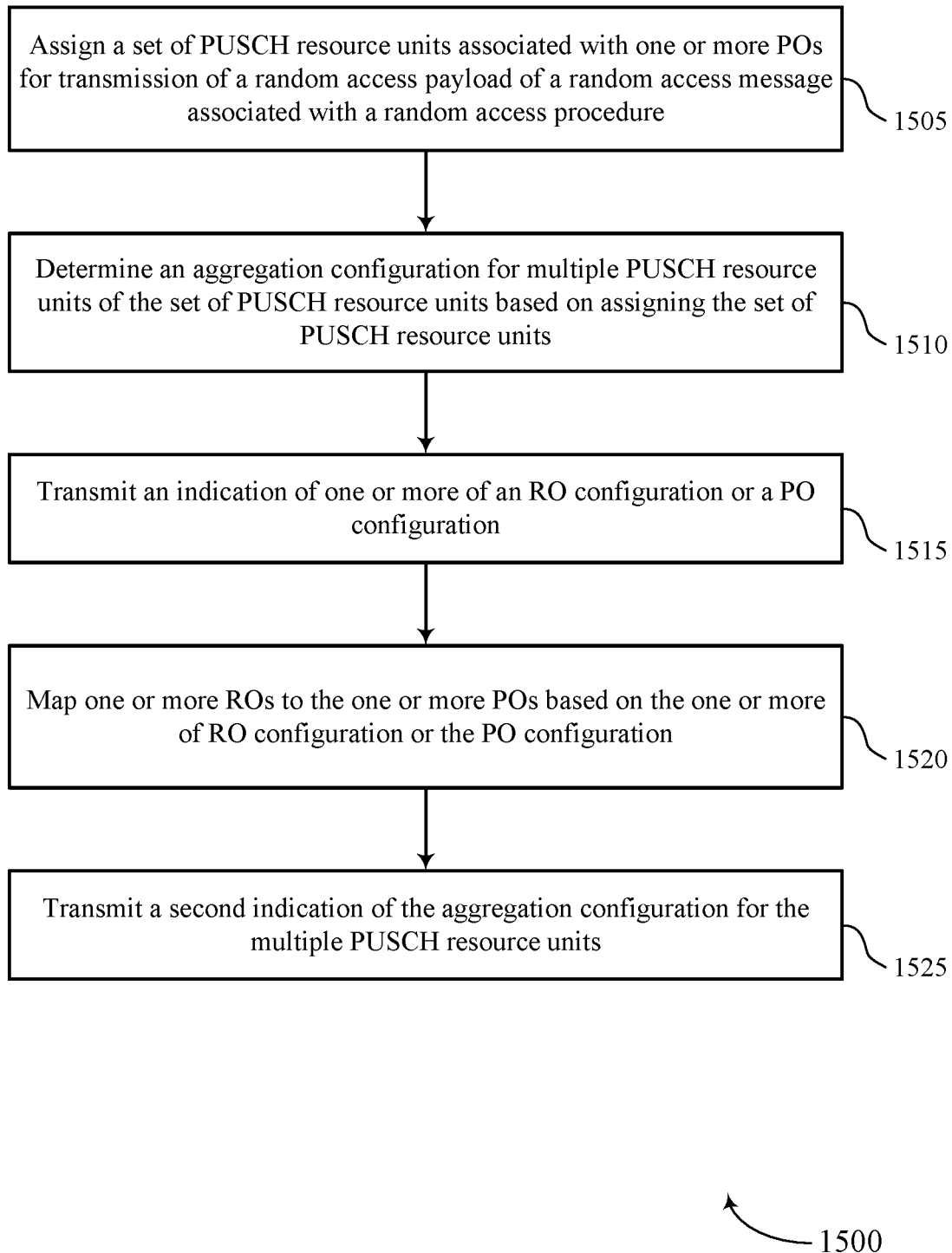

FIG. 15 shows a flowchart illustrating a method 1500 that supports aggregated uplink shared channel transmission for two-step random access channel procedure in accordance with aspects of the present disclosure. The operations of method 1500 may be implemented by a base station 105 or its components as described herein. For example, the operations of method 1500 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may assign a set of PUSCH resource units associated with one or more POs for transmission of a random access payload of a random access message associated with a random access procedure. The operations of 1505 may be performed according to the methods described herein. In some examples, aspects of the operations of 1505 may be performed by an allocation component as described with reference to FIGS. 8 through 11.

At 1510, the base station may determine an aggregation configuration for multiple PUSCH resource units of the set of PUSCH resource units based on assigning the set of PUSCH resource units. The operations of 1510 may be performed according to the methods described herein. In some examples, aspects of the operations of 1510 may be performed by a configuration component as described with reference to FIGS. 8 through 11.

At 1515, the base station may transmit an indication of one or more of an RO configuration or a PO configuration. The operations of 1515 may be performed according to the methods described herein. In some examples, aspects of the operations of 1515 may be performed by a configuration component as described with reference to FIGS. 8 through 11.

At 1520, the base station may map one or more ROs to the one or more POs based on the one or more of RO configuration or the PO configuration. The operations of 1520 may be performed according to the methods described herein. In some examples, aspects of the operations of 1520 may be performed by a mapping component as described with reference to FIGS. 8 through 11.

At 1525, the base station may transmit a second indication of the aggregation configuration for the multiple PUSCH resource units. The operations of 1525 may be performed according to the methods described herein. In some examples, aspects of the operations of 1525 may be performed by a communications component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a random access message of a random access procedure, the random access message comprising a random access preamble and a random access payload;
   aggregating, by the UE, multiple physical uplink shared channel resource units of a set of physical uplink shared channel resource units associated with multiple physical uplink shared channel occasions based at least in part on one or more of a payload size of the random access payload or a modulation and coding scheme associated with the random access payload;
   determining a modulation and coding scheme capability of the UE for the random access message comprising the random access preamble and the random access payload, wherein aggregating the multiple physical uplink shared channel resource units of the set of physical uplink shared channel resource units associated with the one or more physical uplink shared channel occasions is further based at least in part on the modulation and coding scheme capability, wherein a payload size of one or more physical uplink shared channel resource units of the set of physical uplink shared channel resource units is:
   (i) fixed based at least in part on the modulation and coding scheme capability supporting a single modulation and coding scheme; or
   (ii) variable based at least in part on the modulation and coding scheme capability supporting multiple modulation and coding schemes; and
   transmitting the random access payload of the random access message on a physical uplink shared channel using time and frequency resources of the aggregated multiple physical uplink shared channel resource units over the multiple physical uplink shared channel occasions.

2. The method of claim 1, further comprising:
   receiving, from a base station, an indication of an aggregation configuration for the multiple physical uplink shared channel resource units,
   wherein aggregating the multiple physical uplink shared channel resource units of the set of physical uplink shared channel resource units is further based at least in part on the aggregation configuration.

3. The method of claim 2, wherein receiving the indication of the aggregation configuration for the multiple physical uplink shared channel resource units comprises:
   receiving radio resource control signaling.

4. The method of claim 2, wherein receiving the indication comprises:
   receiving one or more of a random access response window for a random access response associated with the random access procedure or a retransmission period of the random access message.

5. The method of claim 2, wherein the aggregation configuration for the multiple PUSCH resource units of the set of PUSCH resource units is based on the modulation and coding scheme capability.

6. The method of claim 1, further comprising:
   receiving, from a base station, an indication of one or more of a random access channel occasion configuration or a physical uplink shared channel occasion configuration; and
   mapping one or more random access channel occasions to the multiple physical uplink shared channel occasions based at least in part on the one or more of the random access channel occasion configuration or the physical uplink shared channel occasion configuration.

7. The method of claim 6, wherein one or more of the one or more random access channel occasions or the multiple physical uplink shared channel occasions are contiguous in one or more of a time domain or a frequency domain.

8. The method of claim 6, wherein one or more of the one or more random access channel occasions or the multiple physical uplink shared channel occasions are noncontiguous in one or more of a time domain or a frequency domain.

9. The method of claim 6, wherein mapping the one or more random access channel occasions to the multiple physical uplink shared channel occasions comprises:
   mapping the random access preamble to the multiple physical uplink shared channel occasions in one or more of a time domain or a frequency domain based at least in part on the random access channel occasion configuration or the physical uplink shared channel occasion configuration.

10. The method of claim 6, wherein mapping the one or more random access channel occasions to the multiple physical uplink shared channel occasions comprises:
   assigning available random access preambles including the random access preamble of the random access message associated with the one or more random access channel occasions to the multiple physical uplink shared channel occasions; and mapping the assigned random access preambles to the multiple physical uplink shared channel occasions.

11. The method of claim 6, wherein the random access channel occasion configuration comprises one or more of: a periodicity of a random access channel occasion, a time and frequency resource allocation of the random access channel occasion, a preamble sequence configuration for a contention-based random access procedure or a contention-free random access procedure, an association rule between random access channel occasions and physical uplink shared channel occasions, or a beam association rule between a synchronization signal blocks or a channel state information reference signal and the random access channel occasion.

12. The method of claim 6, wherein the physical uplink shared channel occasion configuration comprises one or more of: a periodicity of a physical uplink shared channel occasion, a time and frequency resource allocation of the physical uplink shared channel occasion or a physical uplink shared channel resource unit, a demodulation reference signal configuration, a physical uplink shared channel waveform configuration, beam management information for the physical uplink shared channel.

13. The method of claim 1, further comprising:
mapping the random access payload to one or more of one or more random access channel occasions or the multiple physical uplink shared channel occasions in one or more of a time domain or a frequency domain based at least in part on a hopping sequence.

14. The method of claim 1, wherein transmitting the random access payload of the random access message on the physical uplink shared channel using the time and frequency resources of the aggregated multiple physical uplink shared channel resource units over the multiple physical uplink shared channel occasions comprises:
transmitting the random access payload of the random access message on the time and frequency resources of the aggregated multiple physical uplink shared channel resource units using a same modulation and coding scheme for each physical uplink shared channel resource unit of the aggregated multiple physical uplink shared channel resource units.

15. The method of claim 1, wherein transmitting the random access payload of the random access message on the physical uplink shared channel using the time and frequency resources of the aggregated multiple physical uplink shared channel resource units over the multiple physical uplink shared channel occasions comprises:
transmitting, in one or more of the random access preamble or a control portion of the random access payload, an indication of the time and frequency resources of the aggregated multiple physical uplink shared channel resource units based at least in part on the modulation and coding scheme capability supporting multiple modulation and coding schemes.

16. The method of claim 1, further comprising:
mapping a set of demodulation reference signals to random access preambles of physical uplink shared channel resource units of the aggregated multiple physical uplink shared channel resource units based at least in part on a mapping rule.

17. The method of claim 16, wherein each physical uplink shared channel resource unit of the aggregated multiple physical uplink shared channel resource units are associated with a unique demodulation reference signal of the set of demodulation reference signals.

18. The method of claim 16, wherein the aggregated multiple physical uplink shared channel resource units share a same demodulation reference signal of the set of demodulation reference signals.

19. The method of claim 1, wherein aggregating the multiple physical uplink shared channel resource units of the set of physical uplink shared channel resource units associated with the multiple physical uplink shared channel occasions comprises:
comparing the payload size of the random access payload to an aggregated payload size of the aggregated multiple physical uplink shared channel resource units;
determining a quantity of unused bits of the aggregated payload size of the aggregated multiple physical uplink shared channel resource units based at least in part on the comparing; and
padding each unused bit of the quantity of unused bits of the aggregated payload size of the aggregated multiple physical uplink shared channel resource units with a null bit.

20. The method of claim 1, further comprising:
receiving, from a base station, an indication of a power configuration, wherein transmitting the random access payload of the random access message on the physical uplink shared channel using the time and frequency resources of the aggregated multiple physical uplink shared channel resource units over the multiple physical uplink shared channel occasions comprises:
transmitting the random access payload of the random access message on the time and frequency resources of the aggregated multiple physical uplink shared channel resource units using a same transmit power for each physical uplink shared channel resource unit of the aggregated multiple physical uplink shared channel resource units.

21. The method of claim 1, wherein one or more physical uplink shared channel resource units of the set of physical uplink shared channel resource units have a default payload size.

22. The method of claim 1, wherein transmitting the random access payload of the random access message on the physical uplink shared channel using the time and frequency resources comprises:
transmitting using the time and frequency resources that are consecutive in one or more of a time domain or a frequency domain.

23. The method of claim 1, further comprising:
receiving a random access response message comprising an indication to perform a random access fallback procedure, wherein the random access fallback procedure comprises a four-step random access procedure; and
performing the random access fallback procedure based at least in part on receiving the random access response message.

24. The method of claim 1, further comprising:
receiving a random access response message comprising an indication to retransmit the random access message; and
retransmitting the random access message based at least in part on the random access response message.

25. The method of claim 1, wherein a physical uplink shared channel resource unit of the set of physical uplink shared channel resource units spans a physical uplink shared channel occasion; and wherein the aggregated multiple physical uplink shared channel resource units span over the multiple physical uplink shared channel occasions.

26. A user equipment (UE) for wireless communication, comprising:
one or more processors,
one or more memories coupled with the one or more processors; and
instructions stored in the one or more memories and executable by the one or more processors to cause the UE to:
identify a random access message of a random access procedure, the random access message comprising a random access preamble and a random access payload;
aggregate, by the UE, multiple physical uplink shared channel resource units of a set of physical uplink shared channel resource units associated with multiple physical uplink shared channel occasions based at least in part on one or more of a payload size of the random access payload or a modulation and coding scheme associated with the random access payload;
determine a modulation and coding scheme capability of the UE for the random access message comprising the random access preamble and the random access payload, wherein aggregating the multiple physical uplink shared channel resource units of the set of physical uplink shared channel resource units associated with the one or more physical uplink shared channel occasions is further based at least in part on the modulation and coding scheme capability, wherein a payload size of one or more physical uplink shared channel resource units of the set of physical uplink shared channel resource units is
(i) fixed based at least in part on the modulation and coding scheme capability supporting a single modulation and coding scheme; or
(ii) variable based at least in part on the modulation and coding scheme capability supporting multiple modulation and coding schemes; and
transmit the random access payload of the random access message on a physical uplink shared channel using time and frequency resources of the aggregated multiple physical uplink shared channel resource units over the multiple physical uplink shared channel occasions.

27. A user equipment (UE) for wireless communication, comprising:
means for identifying a random access message of a random access procedure, the random access message comprising a random access preamble and a random access payload;
means for aggregating, by the UE, multiple physical uplink shared channel resource units of a set of physical uplink shared channel resource units associated with multiple physical uplink shared channel occasions based at least in part on one or more of a payload size of the random access payload or a modulation and coding scheme associated with the random access payload;
means for determining a modulation and coding scheme capability of the UE for the random access message comprising the random access preamble and the random access payload, wherein aggregating the multiple physical uplink shared channel resource units of the set of physical uplink shared channel resource units associated with the one or more physical uplink shared channel occasions is further based at least in part on the modulation and coding scheme capability, wherein a payload size of one or more physical uplink shared channel resource units of the set of physical uplink shared channel resource units is
(i) fixed based at least in part on the modulation and coding scheme capability supporting a single modulation and coding scheme; or
(ii) variable based at least in part on the modulation and coding scheme capability supporting multiple modulation and coding schemes; and
means for transmitting the random access payload of the random access message on a physical uplink shared channel using time and frequency resources of the aggregated multiple physical uplink shared channel resource units over the multiple physical uplink shared channel occasions.

28. A non-transitory computer-readable medium storing code for wireless communication at a user equipment (UE), the code comprising instructions executable by a processor to:
identify a random access message of a random access procedure, the random access message comprising a random access preamble and a random access payload;
aggregate, by the UE, multiple physical uplink shared channel resource units of a set of physical uplink shared channel resource units associated with multiple physical uplink shared channel occasions based at least in part on one or more of a payload size of the random access payload or a modulation and coding scheme associated with the random access payload;
determine a modulation and coding scheme capability of the UE for the random access message comprising the random access preamble and the random access payload, wherein aggregating the multiple physical uplink shared channel resource units of the set of physical uplink shared channel resource units associated with the one or more physical uplink shared channel occasions is further based at least in part on the modulation and coding scheme capability, wherein a payload size of one or more physical uplink shared channel resource units of the set of physical uplink shared channel resource units is
(i) fixed based at least in part on the modulation and coding scheme capability supporting a single modulation and coding scheme; or
(ii) variable based at least in part on the modulation and coding scheme capability supporting multiple modulation and coding schemes; and
transmit the random access payload of the random access message on a physical uplink shared channel using time and frequency resources of the aggregated multiple physical uplink shared channel resource units over the multiple physical uplink shared channel occasions.

* * * * *